(12) United States Patent
Gurbani et al.

(10) Patent No.: US 11,961,511 B2
(45) Date of Patent: Apr. 16, 2024

(54) SYSTEM AND METHOD FOR DISAMBIGUATION AND ERROR RESOLUTION IN CALL TRANSCRIPTS

(71) Applicant: Vail Systems, Inc., Deerfield, IL (US)

(72) Inventors: Vijay K. Gurbani, Lisle, IL (US); Jordan Hosier, Chicago, IL (US); Yu Zhou, Naperville, IL (US); Nikhita Sharma, Chicago, IL (US); Neil Milstead, Chicago, IL (US)

(73) Assignee: VAIL SYSTEMS, INC., Deerfield, IL (US)

( * ) Notice: Subject to any disclaimer, the term of this patent is extended or adjusted under 35 U.S.C. 154(b) by 130 days.

(21) Appl. No.: 17/091,178

(22) Filed: Nov. 6, 2020

(65) Prior Publication Data

US 2021/0142789 A1 May 13, 2021

Related U.S. Application Data

(60) Provisional application No. 63/083,650, filed on Sep. 25, 2020, provisional application No. 62/932,949, filed on Nov. 8, 2019.

(51) Int. Cl.
*G10L 15/16* (2006.01)
*G10L 15/183* (2013.01)
*G10L 15/26* (2006.01)

(52) U.S. Cl.
CPC ............ *G10L 15/16* (2013.01); *G10L 15/183* (2013.01); *G10L 15/26* (2013.01)

(58) Field of Classification Search
CPC ........ G10L 15/16; G10L 15/183; G10L 15/26
See application file for complete search history.

(56) References Cited

U.S. PATENT DOCUMENTS 5,822,741 A * 10/1998 Fischthal ............... G06Q 40/08
705/31
9,558,740 B1 * 1/2017 Mairesse ................. G10L 15/22
(Continued)

FOREIGN PATENT DOCUMENTS

| KR | 101801308 | 11/2017 |
| KR | 20190098090 | 8/2019 |
| WO | 2019161193 | 8/2019 |

OTHER PUBLICATIONS

Henry Mao, "GPT3 and SEO: why AI will revolutionize your content forever", Feb. 2019, Jenni.ai Blog, accessible at: https://jenni.ai/blog/gpt3-seo-content-marketing (Year: 2019).*

(Continued)

*Primary Examiner* — Bhavesh M Mehta
*Assistant Examiner* — Darioush Agahi
(74) *Attorney, Agent, or Firm* — ICE MILLER LLP

(57) ABSTRACT

A system and method for detecting and resolving mis-transcriptions in a transcript generated by an automatic speech recognition system when transcribing spoken words. The system and method receive a machine language generated transcript of a speech signal by at least one of a first machine learning system and a second machine learning system, and analyze the machine language generated transcript to find a region of low confidence indicative of a mis-transcription and predict an improvement to the region of low confidence indicative of the mis-transcription. The system and method select a replacement word for the mis-transcription based on the predicted improvement to the region of low confidence and replace the mis-transcription by the replacement word to generate a corrected transcript.

16 Claims, 6 Drawing Sheets

(56) References Cited

U.S. PATENT DOCUMENTS

| | | |
|---|---|---|
| 10,388,272 B1 | 8/2019 | Thomson et al. |
| 2010/0121638 A1 | 5/2010 | Pinson et al. |
| 2010/0312546 A1 | 12/2010 | Chang et al. |
| 2013/0238336 A1 | 9/2013 | Sung et al. |
| 2014/0365216 A1* | 12/2014 | Gruber ................ G10L 13/027 704/235 |
| 2015/0243278 A1* | 8/2015 | Kibre .................. G10L 15/187 704/243 |
| 2017/0004831 A1 | 1/2017 | White et al. |
| 2017/0076718 A1 | 3/2017 | Popovici et al. |
| 2017/0301352 A1 | 10/2017 | Strohman et al. |
| 2017/0337923 A1* | 11/2017 | Komissarchik ......... G10L 15/22 |
| 2018/0068661 A1 | 3/2018 | Printz |
| 2019/0221213 A1 | 7/2019 | Shah et al. |
| 2020/0019863 A1* | 1/2020 | Dua .................... G10L 15/197 |
| 2020/0135177 A1* | 4/2020 | Li .......................... G06F 40/20 |
| 2020/0286476 A1* | 9/2020 | Abdulkader ............ G10L 15/01 |
| 2020/0286485 A1* | 9/2020 | Steelberg .............. G10L 15/063 |
| 2020/0286487 A1* | 9/2020 | Abdulkader ............ G10L 15/22 |
| 2021/0099317 A1* | 4/2021 | Hilleli ................. H04L 12/1822 |

OTHER PUBLICATIONS

International Search Report issued in PCT/US2020/059693, dated Feb. 23, 2021.

Devlin, Jacob, et al. "Bert: Pre-training of deep bidirectional transformers for language understanding." arXiv preprint arXiv:1810. 04805 (2019).

Supplementary European Search Report issued in EP 20885043, dated Sep. 20, 2023.

* cited by examiner

SYSTEM AND METHOD FOR DISAMBIGUATION AND ERROR RESOLUTION IN CALL TRANSCRIPTS

CROSS REFERENCE TO PRIOR APPLICATION

This application claim priority to and the benefit thereof from provisional U.S. Patent Applications, Ser. No. 62/932,949, filed on Nov. 8, 2019, titled "Disambiguation and Error Resolution in Call Transcripts," and 63/083,650, filed Sep. 25, 2020, titled "Lightweight Domain Adaptation: A Filtering Pipeline to Improve Accuracy of an Automatic Speech Recognition (ASR) Engine," the entireties of which are hereby incorporated herein by reference and fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates to a system, methodology and computer program for identifying potential errors in natural language processing and improving the accuracy of transcriptions generated by Natural Language Processing (NLP) systems.

BACKGROUND OF THE DISCLOSURE

Ambiguity is inherent to human language and poses a unique challenge both to human listeners as well as NLP systems. Ambiguity is understood as a type of uncertainty that allows for more than one plausible interpretation of an utterance. Ambiguity can introduce problems for NLP systems designed to, for example, execute machine translation, determine sentiment, or perform automatic speech recognition. The inventors have found that there exists an urgent and unmet need for a system or method that can identify and resolve mis-transcriptions that can arise from phonetic ambiguity and degraded acoustic signals in large datasets of call transcripts.

SUMMARY OF THE DISCLOSURE

After extensive analysis of various NLP and Automatic Speech Recognition (ASR) systems, the inventors have discovered that ambiguity can introduce problems for NLP systems designed to, for example, execute machine translation, determine sentiment, and perform automatic speech recognition. The inventors have created a system, methodology and computer program that can detect, identify and resolve mis-transcriptions that can arise from phonetic ambiguity and degraded acoustic signals in large datasets of call transcripts.

In a non-limiting embodiment of the disclosure, a computer-implemented method is provided for detecting and resolving mis-transcriptions in a transcript generated by an automatic speech recognition system when transcribing spoken words. The method comprises: receiving a machine language generated transcript of a speech signal by at least one of a first machine learning system and a second machine learning system; analyzing, by the at least one of the first machine learning system and the second machine learning system, the machine language generated transcript to find a region of low confidence indicative of a mis-transcription; analyzing, by the at least one of the first machine learning system and the second machine learning system, the region of low confidence and predicting an improvement to the region of low confidence indicative of the mis-transcription; selecting, by a word selector, a replacement word for the mis-transcription based on the predicted improvement to the region of low confidence; and replacing, by the word selector, the mis-transcription by the replacement word. The computer-implemented method can comprise generating a corrected transcript.

In the computer-implemented method, the first machine learning system and the second machine learning system can be connected in tandem or in parallel.

In the computer-implemented method, the first machine learning system can comprise a RAILS model architecture.

In the computer-implemented method, the second machine learning system can comprise a BERT model architecture or a GPT-3 model architecture. The BERT model architecture or the GPT-3 model architecture can be trained (or augmented) with, for example, domain specific data.

In the computer-implemented method, the word selector can comprise a trained decision trees model or a Random Forests model. In an embodiment, the word selector can comprise a neural network, a multinomial logistic model, a Support Vector Machine.

The RAILS model can be constructed from a building block comprising: a dataset containing all unigrams, bigrams, trigrams and quadgrams present in a corpus of transcripts and their respective probabilities; and/or a phonetic encoding component for determining phonetic similarity between lexical items.

In another non-limiting embodiment of the disclosure, a system is provided for detecting and resolving mis-transcriptions in a transcript generated by an automatic speech recognition system when transcribing spoken words. The system comprises a first filter arranged to receive a machine language generated transcript of a speech signal, and a second filter arranged to receive the machine generated transcript and a predicted improvement to the region of low confidence from the first filter. The first filter includes a first machine learning system arranged to analyze the machine language generated transcript and find a region of low confidence indicative of a mis-transcription, and a second machine learning system arranged to analyze the region of low confidence and predict an improvement to the region of low confidence. The second filter is arranged to receive the machine generated transcript and the predicted improvement to the region of low confidence from the first filter, and, based on the predicted improvement to the region of low confidence, select a replacement word for the mis-transcription, and replace the mis-transcription by the replacement word.

In the system, the first machine learning system can comprise a RAILS model architecture, and the second machine learning system can comprise a BERT model architecture or a GPT-3 model architecture. The RAILS model can be constructed from a building block comprising a dataset containing all unigrams, bigrams, trigrams and quadgrams present in a corpus of transcripts and their respective probabilities, or a phonetic encoding component for determining phonetic similarity between lexical items.

In the system, the second filter can comprise a trained decision trees model or a Random Forests model. In an embodiment, the word selector can comprise a neural network, a multinomial logistic model, a Support Vector Machine.

In another non-limiting embodiment of the disclosure, a non-transitory computer readable storage medium is provided. The non-transitory computer readable storage medium contains computer program instructions for detecting and resolving mis-transcriptions in a transcript generated by an automatic speech recognition system when transcribing spoken words. The computer program instructions, when executed by a processor, cause the processor to perform an operation comprising: receiving a machine language generated transcript of a speech signal by at least one of a first machine learning system and a second machine learning system; analyzing, by the at least one of the first machine learning system and the second machine learning system, the machine language generated transcript to find a region of low confidence indicative of a mis-transcription; analyzing, by the at least one of the first machine learning system and the second machine learning system, the region of low confidence and predicting an improvement to the region of low confidence indicative of the mis-transcription; selecting, by a word selector, a replacement word for the mis-transcription based on the predicted improvement to the region of low confidence; and replacing, by the word selector, the mis-transcription by the replacement word. The first machine learning system and the second machine learning system can be connected in tandem or in parallel. The first machine learning system can comprise a RAILS model architecture; the second machine learning system can comprise a BERT model architecture or GPT-3 model architecture; and, the word selector can comprise a trained decision trees model or a Random Forests model.

Additional features, advantages, and embodiments of the disclosure and, therefore, the cybersecurity solution, may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
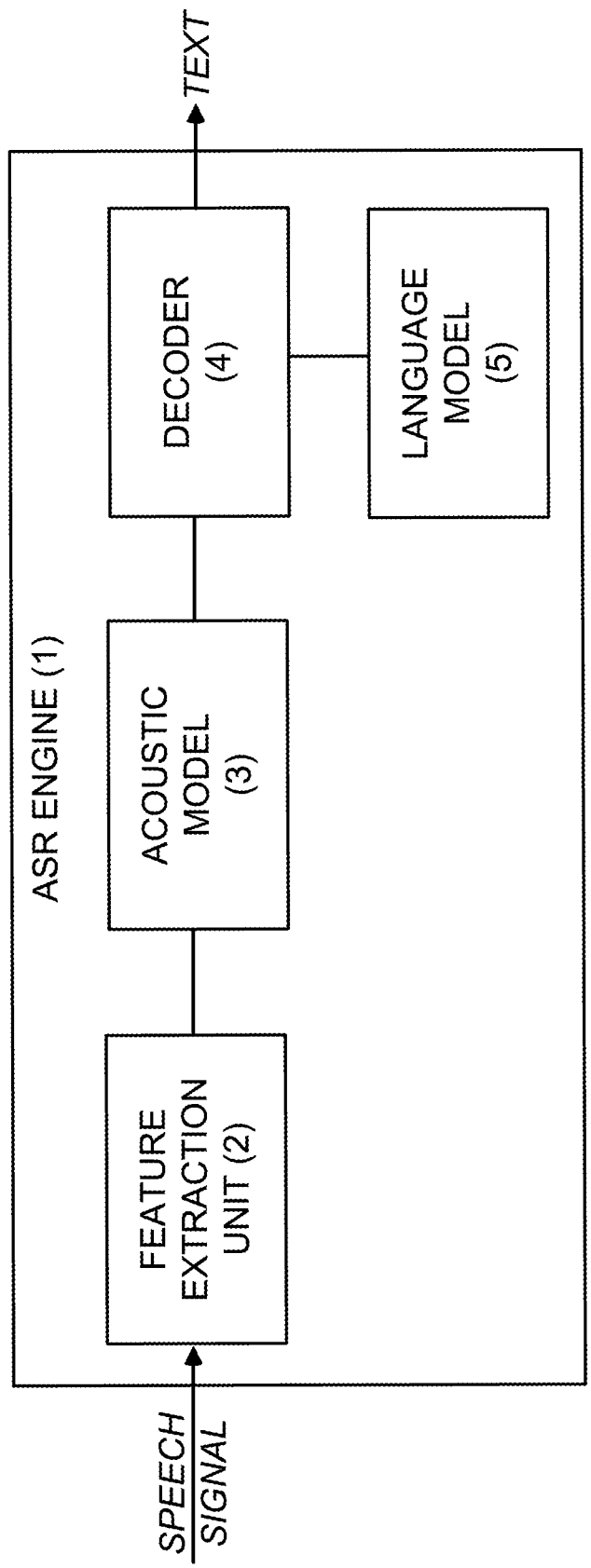
FIG. 1 shows an example of an ASR engine

The present disclosure is further described in the detailed description that follows.

DETAILED DESCRIPTION OF THE DISCLOSURE

The disclosure and its various features and advantageous details are explained more fully with reference to non-limiting embodiments and examples described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as not to unnecessarily obscure the embodiments or examples of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Despite the widespread availability of Automatic Speech Recognition (ASR) systems in both open source and commercial applications, high error rates in some domains remain a lingering impediment for effective speech recognition. The effect of these errors on the overall performance of ASR systems highlights the need for techniques to automatically detect and rectify such errors. This is important not only for improving overall ASR performance, but also in an effort to contain potential adverse effects of such errors on downstream language modeling processes and post-hoc analyses.

The standard metric of ASR evaluation is Word Error Rate (WER), which is measured by dividing the number of misrecognized words by the total number of words processed. An ASR system typically seeks to minimize its WER. Some ASR systems have been found to be quite successful under well controlled, ideal circumstances, with WER in the 5-10% range. However, WER can increase substantially in noisy, unfamiliar settings, particularly in Large Vocabulary Continuous Speech Recognition (LVCSR) applications. The gap in WER between ideal deployment settings and LVCSR applications necessitates the need for alternative methods to independently mitigate ASR transcription errors. The inventors have determined that such a system should be capable of, independent of the ASR system used, detecting and correcting transcription errors and thus decreasing the overall WER.

The performance of ASR engines has improved tremendously in recent years with the advent of deep learning, getting closer to human-like WERs. By some measures, the best human accuracies on well-known datasets such as, for example, the Switchboard (SWB) and CallHome (CH) are 5.1% and 6.8%, respectively. ASR systems have been reported to demonstrate a WER of 5.5% and 11.0% on SWB and CH, respectively. While ASR systems continue to improve, there is still a wide variance in the WER rates among ASR engines and even within a single ASR engine depending on the particular domain of deployment.

Traditionally, accuracy improvements in ASR engines have been driven by improvements in acoustic and language modeling, the availability of a large amount of training data, and high computational resources. Because of the large corpora required in training ASR engines—thousands of hours to tens of thousands of hours, and even more—techniques have been developed to investigate speeding up the training phase. These techniques range from distributed training across high-performance computing (HPC) infrastructure to bespoke hardware in the form of Graphical Processing Units (GPUs).

Despite impressive advances driven by novel deep learning techniques and bespoke hardware chips, ASR errors are inevitable and remain problematic. Some of the errors stem from the imperfection of today's speech recognition technology, while others are introduced due to inherent and irreducible noise in the out-of-sample (test) audio samples. Error detection can be done on decoder-based features, for example, features generated as a byproduct of the ASR process—word confidence scores, language model, and similar artifacts—or it can be performed on the combination of decoder features and exogenous non-decoder based features. Furthermore, before an error can be corrected, it must be detected, thus error correction techniques subsume error detection. Finally, once an error is detected, it can be corrected automatically, or require manual intervention. The majority of existing work in this area focuses on error detection and manual error correction. A system and methodology are needed that can implement correction techniques that do not require human intervention. The instant disclosure provides a system and methodology that satisfies that need, and others, and can include decoder-based automatic (that is, non-manual) error correction techniques.

Deep neural network (DNN) architectures based on transformer models have accelerated the field of speech recognition. Deriving WERs with values less than or equal to 0.20 (WER≤0.20), which is a measure of the performance of an ASR engine (the lower the WER value, the better), is demonstrably achievable under varying conditions. Even lower WER measures can be achieved under ideal conditions (professional studio recording, high fidelity channel encoding, noise- and error-free signals, etc.).

Ambiguity in natural language is a central problem for speech processing systems. It can be functionally impossible to resolve all potentially ambiguous utterances without incorporating infinite world knowledge. Nonetheless, traditional lexicons in ASR system settings assume that words can be defined by an enumerable set of parameters. As a result, when ASR systems are faced with ambiguity, an additional effort of disambiguation is needed.

For instance, in an ASR setting, if the ASR system encounters an ambiguous word (for example, a word that has a homophonous competitor), the system must select the most appropriate word available based on its perception of the word that was uttered. This can include a process driven by matching phonetic cues with contextual information. This requires that such systems specify the contexts in which words are likely to appear, which can depend greatly on the context in which such systems are trained and deployed.

To satisfactorily extract insight from ASR-generated data, it is important that the content of such data be reliable. Take, for example, a speech-to-text task in which the resulting text is subjected to some further analysis, such as translation. If the word "seller" is uttered, it is possible that the ASR engine will erroneously interpret the token as its homophone, "cellar" as opposed to the intended "seller". Thus, subsequent analyses performed on the generated text can potentially yield incorrect results. The disclosure provides a system and method that can perform ambiguity and error resolution, in this context, thereby allowing for more accurate text which can be used to deploy more robust language models and applications.

Most ASR engines are trained on acoustic and language models constructed from corpora that include news feeds, books, and blogs in order to achieve better generalization. Consequently, when such engines are presented an unseen dataset in a specific domain, the WER suffers by a non-trivial margin. While the drop in accuracy is acute when the domain is very specific (for example, health or medicine), the inventors have observed that the drop is sizable even when the domain is general enough, for example, hospitality. For such domains, the inventors have discovered that the systems and methods described herein can further lower WER values significantly.

In a non-limiting embodiment of the disclosure, a system and method are provided that include an error resolution filtering pipeline. The system and method can include one or more machine learning models, such as, for example, n-gram frequencies and decision trees, in a filtering pipeline (for example, Error Resolution Pipeline 55, shown in FIG. 3). The pipeline can be arranged to seamlessly integrate powerful, pre-trained language models, such as, for example, BERT (Bidirectional Encoder Representation from Transformers) and RAILS (discussed below), all working in conjunction to derive a 1-best hypothesis word selection algorithm. The system and method can include an error resolution pipeline that reduces the WER between 1.6% to 2.5% (or less) absolute while treating the ASR engine that provided the input transcript text as a black box and without requiring additional complex discriminative training.

In a non-limiting embodiment, a system and method are provided that can identify mis-transcriptions present in ASR-generated transcripts. The mis-transcriptions can be confirmed, for example, by comparing the ASR-generated transcript against a verified transcript of the same audio content. The system and method can allow for a general evaluation of ASR engine performance, as well as highlight and resolve specific areas of difficulty for ASR engines, such as, for example, when presented with language terms such as "considerate" or "consider it". The system and method can identify ambiguities or erroneous words or utterances in a call transcript, generate or predict replacement words for the identified ambiguities or errors, and replace or correct the ambiguities or errors with the replacement words. The system and method can include an error resolution component that, given a mis-transcribed word, can use surround language characteristics, including contextual cues, vector similarities, phonetic distances, n-gram counts, and word embedding to suggest a more likely, phonetically similar word, and, where applicable, replace the mis-transcribed word with the correct word to output a corrected transcript with a significantly lower WER value, such as, for example, between 0.016 and 0.025, or lower.

For instance, given ASR-generated text such as in statement (la) below, the system and method can be arranged to suggest higher probability, similar sounding alternatives for any mis-transcribed words, which in this example is "consider it." The result would be a correct transcript, as in statement (1b).

(1) a. He was very kind and very consider it.
 b. He was very kind and very considerate.

The system and method can be arranged to target cases, such as, for example, statement (1) in the following ways: (i) provide a system and method capable of resolving homophone confusion and other mis-transcriptions in ASR-generated text; (ii) identify areas of difficulty for the ASR engine; and (iii) produce more accurate transcripts.

The system and method can be arranged to evaluate existing ASR engines and systems, as well as improve their performance by, for example, tuning parametric values in the ASR engines through feedback provided by the system or method to the ASR system.

The system and method can be arranged to evaluate ASR-generated transcripts, identify ambiguities or errors and suggest correct replacement words. The system and method can be arranged to replace such errors or ambiguities with the correct replacement words based on, for example, a word confidence score, context cues, trigram counts, vector similarities, phonetic similarities or word embeddings.

Ambiguity is ubiquitous in any language. Ambiguity is understood as a type of uncertainty that can allow for more than one plausible interpretation of an utterance. Context can play an important role in the process of disambiguation—what is ambiguous in one context may not be ambiguous in another. Take, for example, the following exchange (2) in ALICE'S ADVENTURES IN WONDERLAND, by Lewis Carroll:

(2) "Mine is a long and sad tale!" said the Mouse, turning to Alice and sighing. "It is a long tail, certainly," said Alice, looking with wonder at the Mouse's tail, "but why do you call it sad?"

The exchange in (2) demonstrates an example of a particular kind of phonetic ambiguity—homophones, which can be defined as words having the same pronunciation but a different meaning or spelling. Ambiguity can also extend beyond the word level. Take, for example, the following two utterances in statement (3):

(3) a. The stuffy nose can lead to problems.
b. The stuff he knows can lead to problems.

In conversational speech, pauses between discrete lexical items can be imperceptible or non-existent, which can make word segmentation difficult. For instance, the phrases "stuffy nose" and "stuff he knows" are oronyms—that is, sequences of words that sound the same but have different meanings. Such ambiguities not only present difficulties for humans, but are particularly challenging in ASR settings, such as, for example, ASR systems. Ambiguities can result in errors in ASR-generated transcripts, which in turn can affect the accuracy of downstream textual analyses. While ambiguities remain a challenge for ASR systems, there exists little work targeted at identifying and resolving homophone confusion in languages, such as, for example, English.

FIG. 1 shows a non-limiting example of an ASR engine 1. A goal of the ASR engine 1 is to map spoken words or utterances in an audio signal containing speech to their corresponding text. The ASR engine 1 can include a feature extraction unit 2, an acoustic model 3, a decoder 4 and a language model 5. The ASR engine 1 is arrange to generate the best guess transcription of the words that were spoken or uttered in the speech signal, as text output.

The ASR engine 1 can include a Kaldi ASR, which is a known open-source toolkit for speech recognition and signal processing, freely available under the Apache License v2.0. The ASR engine 1 can include or ore more ASR models, including, for example, Kaldi Api.Ai and LibriSpeech model, and a Zamia model, discussed in greater detail with respect to non-limiting examples.

Kaldi includes software that is flexible and extensible, and is intended for use in ASR systems. Kaldi can recognize speech and produce corresponding text transcripts of spoken words or utterances. It supports linear transforms, MMI (Maximum Mutual Information), boosted MMI and MCE (Manually-Coded English) discriminative training, feature-space discriminative training, and deep neural networks. Kaldi is capable of generating features such as, for example, MFCC (Mel-Frequency Cepstral Coefficients), FBank (filter bank), and FMLLR (Feature-space Maximum Likelihood Linear Regression). Kaldi can be used in ASR engines to pre-process raw waveforms into acoustic features for end-to-end neural networks.

A waveform—speech signal—can be supplied to an input of the ASR engine 1, where it can be split into small parts or frames, for example, 25 ms in length, and features can be extracted from the speech by the feature extraction unit 2. The feature extraction unit 2 can be arranged to extract MFCCs (Mel-Frequency Cepstral Coefficients), CMVNs (Cepstral Mean and Variance Normalization) that represent the content of the audio, or i-Vectors that capture the style of the speaker or utterance. It can be essential that the features chosen by the feature extraction unit 2 suffice to identify the features of human speech while suppressing unnecessary noise. Thus, the audio signal can be compressed into a sequence of fixed length vectors via feature extraction. Next, the acoustic model 3 can predict which phoneme is being spoken in each frame of audio. The acoustic model can be responsible for modelling the speech acoustics, transcribing the extracted audio features into some sequence of context dependent phonemes. The acoustic model 3 can be trained using Deep Neural Networks (DNNs) on large datasets, for example, thousands of hours of human transcribed audio data.

A lexicon or dictionary can be used to map each word to its phonetic representation, and it can be used by the decoder 4 in the ASR engine 1 to convert the predicted phonemes into words and eventually complete sentences. The language model 5 can determine which words or sequence of words are more likely, given the surrounding words as context. This context can be derived from neural networks or n-gram models trained on large textual datasets. The decoder 4 can use the acoustic model, the grammar, and the language model collectively to generate word sequences that are likely for a particular audio frame. The word sequence with the highest probability can be output as the final text. The ASR engine 1 can be arranged to include word confidence scores in the output.

In a non-limiting embodiment, an Error Resolution Pipeline 55 (shown in FIG. 3) is provided that can identify and resolve mis-transcriptions present in an ASR-generated transcript, such as, for example, the textual transcript output by the ASR engine 1. The ASR-generated transcript can include a transcription of any audio that contains spoken words or utterances. The transcript can comprise, for example, a textual transcription of a customer satisfaction survey recorded by a customer at the end of a call center interaction, a textual transcription of a voice message, or any other spoken or uttered content.

Figure 2:
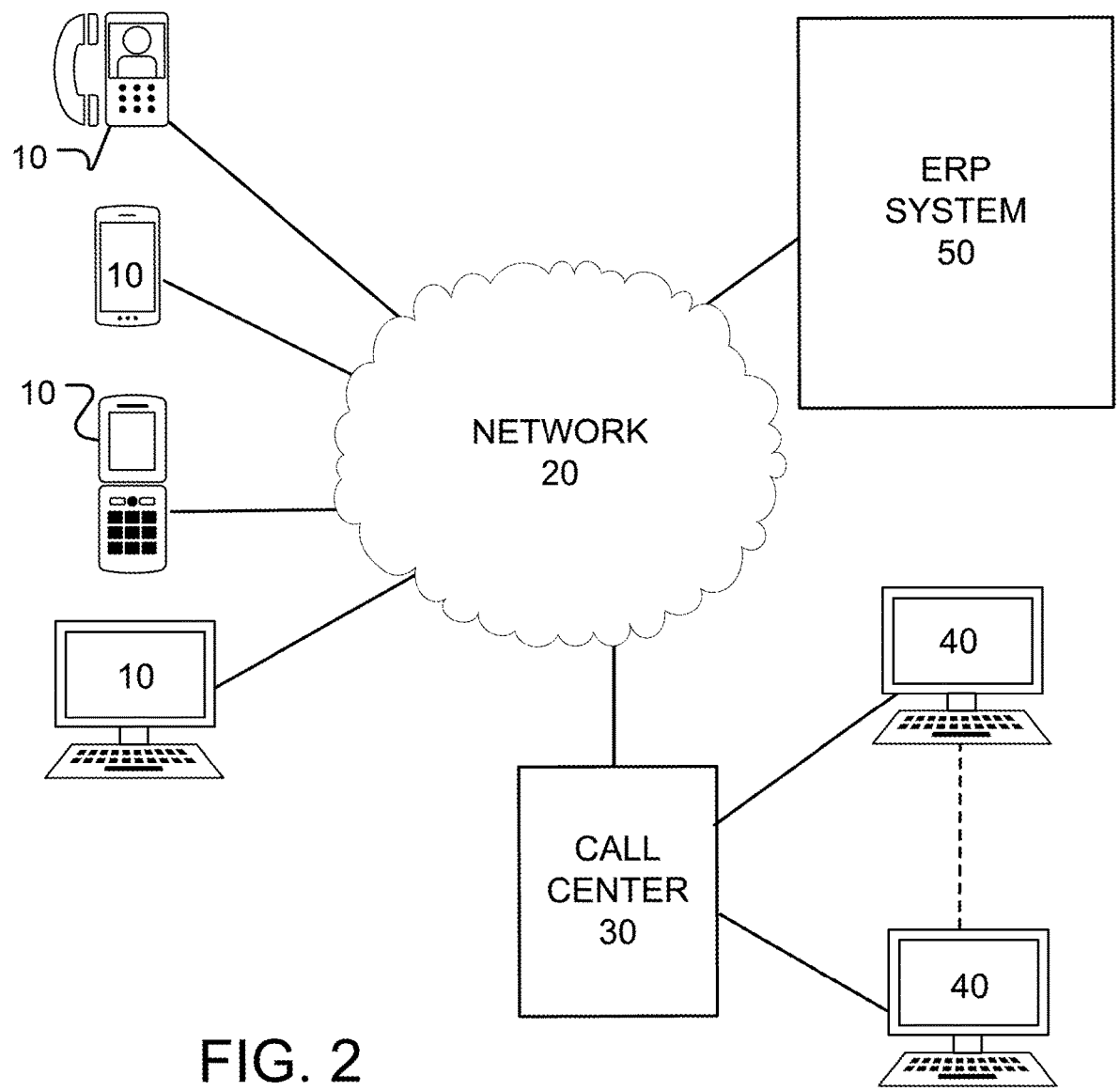
FIG. 2 shows an example of a communication environment provided with an embodiment of an Error Resolution Pipeline (ERP) system.
Figure 3:
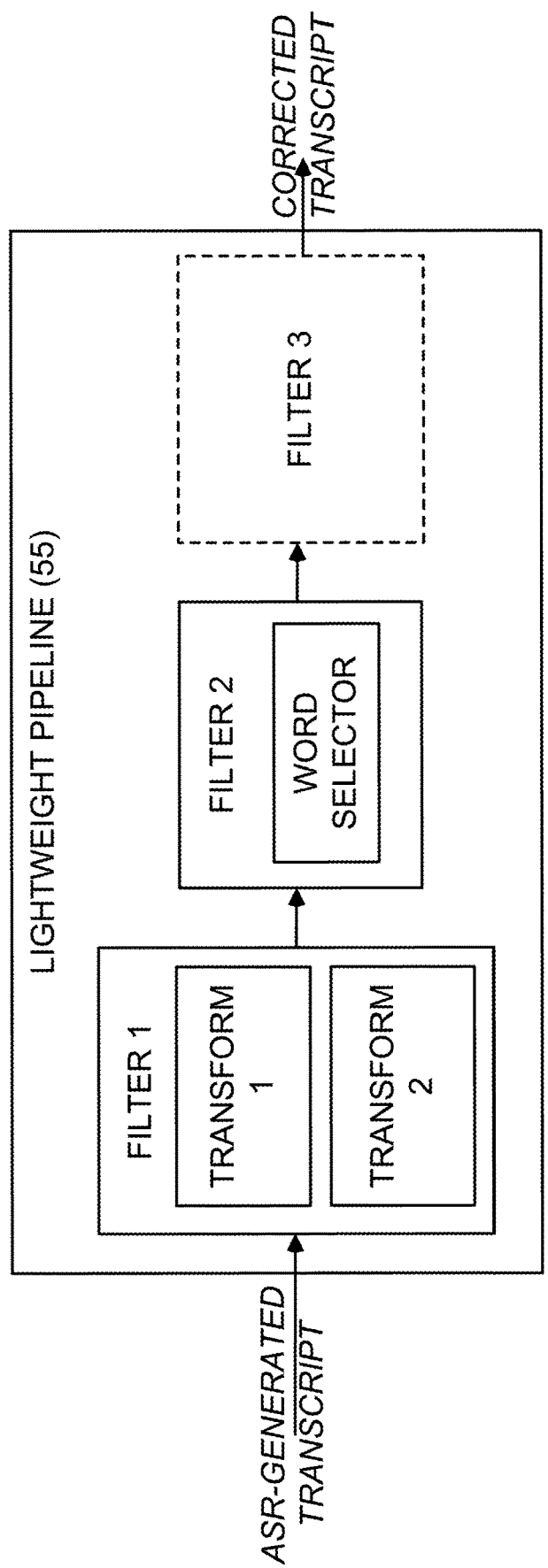
FIG. 3 shows an embodiment of an Error Resolution Pipeline.

FIG. 2 shows a non-limiting example of a communication environment provided with an embodiment of an Error Resolution Pipeline (ERP) system 50, according to the principles of the disclosure. In alternative examples of a communication environment, the ERP system 50 can be included in a communication device 10, a call center 30 or an agent communication device 40. The ERP system 50 can include an ASR system, such as, for example, the ASR engine 1 (shown in FIG. 1). The ERP system 50 can include the Error Resolution Pipeline 55, of which a non-limiting embodiment is depicted in FIG. 3. The ERP system 50 can include an Error Resolution Pipeline Processor (LPP) system 100 (shown in FIG. 5).

Referring to FIG. 2, the communication environment can include one or more communication devices 10, any of which can be arranged to communicate with the other communication devices 10 via a communication link. The communication environment can include a network 20 and the call center 30. The call center 30 can include or be connected to one or more agent communication devices 40. The user communication devices 10 can be arranged to connect directly to each other, the agent communication devices 40, or to the call center 30, over one or more communication links, or through one more communication links and the network 20.

FIG. 3 shows a non-limiting embodiment of the Error Resolution Pipeline 55, constructed according to the principles of the disclosure. The Error Resolution Pipeline 55 can include two or more Filters. As seen, the Error Resolution Pipeline 55 can include a Filter 1 and a Filter 2, as well as one or more additional filters—for example, Filter 3. In an embodiment, the Error Resolution Pipeline 55 can be trained and validated using a training dataset and a testing dataset. The Error Resolution Pipeline 55 can be trained (or augmented) with, for example, domain-specific data.

In a non-limiting embodiment, the Error Resolution Pipeline 55 can be arranged such that it does not require training before operation. This can be a great benefit where an implementation might not justify the resource-intensiveness or costs associated with training, or where it might be impractical to train the machine learning system(s).

In a non-limiting embodiment, the Error Resolution Pipeline 55 includes two filters, namely Filter 1 and Filter 2, in which the first filter (Filter 1) contains two transform models—Transform 1 and Transform 2—and the second filter (Filter 2) contains a word selector. It is noted that additional transform models (not shown) can be included in Filter 1; and additional word selectors (not shown) can be included in Filter 2. The Transform 1 and the Transform 2 can each include any one of a variety of natural language processing models, including, for example, a BERT (Bidirectional Encoder Representations from Transformers) language model, a RAILS (Research on AI in Systems and Linguistics) language model, or a GPT-3 (Generative Pre-trained Transformer 3) language model. The transform models included in Transform 1 and Transform 2 can be different from each other—for example, Transform 1 can include the RAILS language model, and Transform 2 can include the BERT model or GPT-3 model.

In a non-limiting embodiment of Filter 1, the Transform 1 can include the RAILS model, which can be built on simple n-grams and phonetic encodings, as discussed below, to seamlessly integrate a pre-trained unsupervised universal language model in the transform model in Transform 2, such as, for example, the BERT model or GPT-3 model. After filtering and processing the ASR-generated transcript, the result can be output from Filter 1 and forwarded to the word selector in Filter 2, which can include, for example, one or more decision trees, Random Forests or Random Decision Forests, or any combination thereof.

The Error Resolution Pipeline 55 can operate without any human intervention, since it does not require a user to act as an arbiter to improve accuracy. Indeed, the word selector in Filter 2 can be arranged to automatically undertake operations and improve accuracy. The word selector can be trained and validated using a training dataset and testing dataset, including, for example, domain-specific datasets.

The Error Resolution Pipeline 55 can be arranged to eschew more complex discriminative training of acoustic and language models in favor of the simpler ASR-decoder features generated as a byproduct of ASR system processes, such as, for example, the word confidence score provided by the ASR engine 1 (shown in FIG. 1). Hence, the ASR system from which the ASR-generated text is received can be treated as a black box and only require it to produce word confidence scores as part of its decoding output.

Referring to FIG. 3, the Error Resolution Pipeline 55 can be arranged to receive at an input an ASR-generated transcript, for example, from one or ASR engines (for example, Kaldi Api.Ai, LibriSpeech, or Zamia models). The ASR-generated transcript can include a transcript annotated with word confidence scores. The ASR-generated transcript annotated with word confidence scores can be input to Filter 1, which includes the Transform 1 and the Transform 2. Transform 1 and Transform 2 can be arranged in tandem, in which case the ASR-generated transcript can be supplied to an input of the Transform 1 and an output from Transform 1 can be applied to an input of Transform 2. The output of Transform 2 can then be applied to an input of the word selector in Filter 2, which can analyze the input(s) and generate a word or list of words. In the latter case, the Filter 2 can include one or more additional word selectors, or one or more additional filters (for example, Filter 3) can be provided in the Error Resolution Pipeline 55, each including a word selector. The additional Filter 3 can be provided in series with Filter 2 to filter and select a word from the list of words output by Filter 2 and output a corrected transcript.

Alternatively, Transform 1 and Transform 2 can be arranged in parallel, in which case the ASR-generated transcript can be supplied to a respective input of each, and their outputs can be supplied in parallel to one or more inputs of Filter 2.

In a non-limiting embodiment of the Error Resolution Pipeline 55 (shown in FIG. 3), the Transform 1 includes the RAILS model, the Transform 2 includes the BERT model and word selector includes one or more decision trees. The RAILS model can be arranged as a domain-specific model constructed from a corpus using n-gram probabilities augmented with a phonetic distance calculation. The BERT model can include, for example, the $BERT_{BASE}$ model, which includes a 12-layer, 768-hidden, 12-heads, 110M parameter neural network architecture, or the $BERT_{LARGE}$ model, which includes a 24-layer, 1024-hidden, 16-heads, 340M parameter neural network architecture. The RAILS model can receive the ASR-generated transcript as input (including word confidence scores), analyze and process the transcript and supply the result to an input of the BERT model, which can then further analyze and process the results and send its output to the word selector in the Filter 2. The word selector (for example, trained decision tree model) can fit the output to the model and synthesize a final output automatically (that is, without any human intervention) that includes a corrected transcript, with all, or substantially all errors and ambiguities in the original ASR-generated transcript replaced or corrected.

In another non-limiting embodiment, the Transform 1 can include, for example, the RAILS language model and the Transform 2 can include the GPT-3 language model; and, the word model can include the Random Forests model.

In another non-limiting embodiment, Filter 1 can include a third Transform (not shown), in addition to Transform 1 and Transform 2. Transform 1 and Transform 2 can include the BERT model and the RAILS model, respectively, and the third Transform can include the GPT-3 model or another autoregressive language model that uses deep learning to produce human-like text. Transform 1, Transform 2 and the third Transform can be arranged in series or in parallel.

The Error Resolution Pipeline 55 can be implemented with a general purpose ASR engine and adapted to operate in any domain, including for example, telephony, information technology, navigation, automobile, aviation, marine, education, customer service, hospitality, healthcare, medicine or any other domain that might benefit from an accurate transcription from human speech to text, including, speech-to-command applications such as operating a computing device using spleen commands. Because a general purpose ASR engine does not have a language model tuned to recognize the words and utterances used in a particular domain, a WER decrease of, for example, 5-7% or more, can be attained when domain adaptation is used in highly domain-specific settings.

The Error Resolution Pipeline 55 can have applications in any domain, including, for example, where a general purpose ASR engine, with its native acoustic and language model, will suffice, but due to a lossy channel (for example, mobile phone) or a noisy channel (for example, random background noise), the ASR system is not able to perform optimally. For instance, in domains, such as, for example, telephone or VoIP-based customer surveys, where general purpose ASR engines are used to generate customer survey transcripts from speech contained in audio signals or files, the ASR engine may not be able to recognize utterances and words in the speech due to a lossy or noisy channel, both of which are common occurrences in daily life. This can happen even though utterances and words may already be present in the language and acoustic model of the general purpose ASR engine.

As an example, consider the phrase "get another car." In survey transcripts, it is highly unlikely that a customer is surveying a banking-related call center agent by rating whether the agent was able to get the customer another "car." It is more likely that the customer said, "get another card" instead, but due to a degraded channel signal the ASR engine is unable to make out the final phoneme, /d/, in the word "card."

Figure 4:
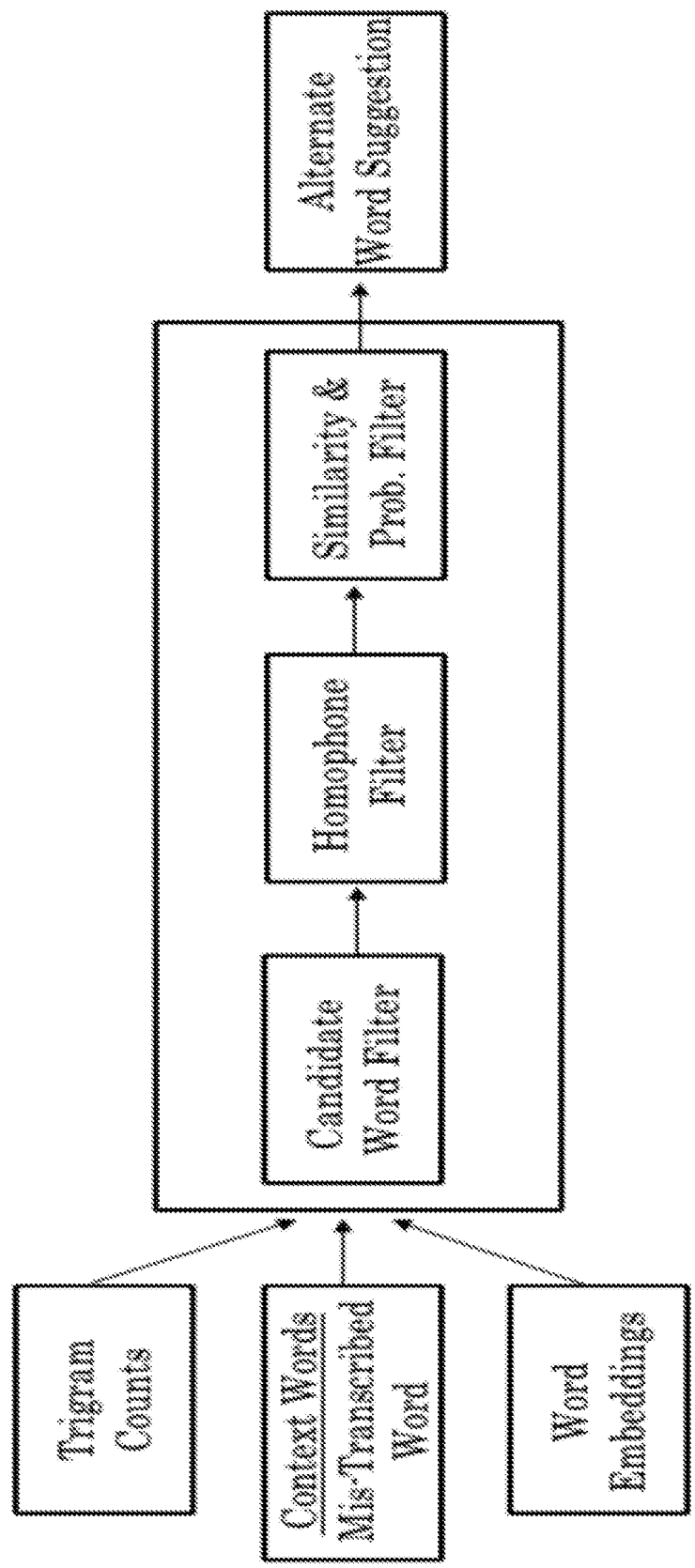
FIG. 4 shows a block diagram of an embodiment of a RAILS language model architecture.

FIG. 4 shows a block diagram of an embodiment of the RAILS language model architecture that can be included in the Filter 1 (shown in FIG. 3). The RAILS model can be arranged to take as input a word embedding for each word in a transcript corpus received from an ASR engine, count for all tri-grams that appear in the corpus, and each mis-transcribed word and the surrounding context words. For example, in the statement (1) above, the RAILS model can be arranged to determine the context words to be "and very" and "it", while determining the mis-transcribed word to be "consider".

The RAILS model can be arranged to analyze the transcript and identify similarities between words in a corpus by predicting the co-occurrence of words. Word embeddings can be created by identifying the words that occur within a context window. The RAILS model can be arranged to calculate how often each word occurs next to every other word within the context window, after normalizing for overall word frequency. The RAILS model can be arranged to build word embeddings based on context windows with a length of, for example, eight words. Context windows having fewer, or more than eight words are contemplated here as well. Based on the resulting dataset, the RAILS model can calculate vector similarity of each word in the corpus. This measure of similarity can be analogous to a measure of word sense similarity. For example, the RAILS model can measure similarity of words based on how often they occur in similar environments.

The RAILS model can be arranged to perform n-gram determinations, including calculating word probability and assigning a probability to each possible next word in a given sequence of words. The n-gram calculation can provide an essential step towards identifying words in ambiguous environments. A "gram" is a unit of text of any length and "n" specifies how many grams can be used in an n-gram calculation. In a non-limiting embodiment, the RAILS model uses trigrams, or chunks of text containing three words. In this regard, the probability P of any given word w can be computed given some history h.

$$P(w|h) \quad \text{(Equation 1)}$$

If the history h is "and very", and a determination is sought for the probability that the next word is "considerate", as in the statement (1b) above, then:

$$P(\text{considerate}|\text{and very}) \quad \text{(Equation 2)}$$

The RAILS model can be arranged to estimate this probability by computing relative frequency counts. For instance, analyzing the ASR-generated transcript, the RAILS model can compute the number of times "and very" (h) occurs and the number of times it is followed by "considerate" (w). For instance, the RAILS model can calculate the following: out of the times h appeared, how many times was it followed by w, represented as follows:

$$P(\text{considerate}|\text{and very}) = C(\text{considerate})/C(\text{and very}) \quad \text{(Equation 3)}$$

where C is the frequency count function, and P(considerate|and very) is the probability of "considerate" appearing in this context.

While the RAILS model can be arranged to calculate similarity based on word co-occurrence, it can also be arranged to determine another important measure of similarity for homophone resolution, namely phonetic similarity between words. For instance, the RAILS model can be arranged to perform a homophone lookup on each mis-transcribed word to see if there exists a homophonous word in the corpus with a higher probability in context. The model can do this, given a word or a string of words, by deriving an encoding based on the sounds contained in the word(s). In this regard, the RAILS model can include, for example, a Match Rating Approach (MRA), which includes a phonetic encoding algorithm for the comparison of homophonous names. Such an approach need not be perfect, it need only serve as a good approximation in certain non-limiting applications where it is desirable to avoid having to phonetically transcriber every word in the corpus.

The RAILS model, using the match rating approach, can provide the following determination for statement (4), as applied to "consider it" and "considerate":

(4) a. consider it=CNSDR T
  b. considerate=CNSDRT

Given two phonetic encodings, it can compare the two strings and calculate an edit distance between two tokens. In this case, the phonetic encoding of "consider it" and "considerate" are exact matches and, thus, have an edit distance of zero (0) when the space is removed. The decision to remove the space is a reasonable one, as spaces between words, while present, orthographically, are rarely realized in conversational speech.

The RAILS model can include numerous parameters, including several that can be used to filter an initial candidate word list for high probability, similar words—both in terms of vector similarity and phonetic similarity. The initial candidate word list can be comprised of all words in the corpus that appeared after the previous two context words. The parameters can include, for example, a token length, a probability, a vector similarity, and a phonetic distance. Prior to any filtering, the RAILS model can check the candidate word list for any exact homophones. The phonetic encoding of a mis-transcribed word, as well as the concatenation of the mis-transcribed word and the following word, can be compared against the phonetic encoding of every candidate. If there exists a highly probable exact homophone match, the match can be suggested in place of the mis-transcribed word.

The RAILS model can use the token length parameter to verify that one or more suggested replacement words are a reasonable length when compared to the mis-transcribed word. This parameter can be important where highest frequency words tend to be function words, and where such words have a high probability in many contexts. Further, these words can have overlapping sounds with the mis-transcribed words. The RAILS model can be arranged to ensure that short, function words are not suggested in place of content words. For this reason, the RAILS model can be arranged to filter the candidate word list for words that are, for example, at least 0.6× (or 60% of) the length of the mis-transcribed word.

The RAILS model can be arranged to filter words that have a probability of, for example, greater than or equal to 0.001 (P≥0.001) and a vector similarity of, for example, greater than or equal to 0.001 (VS≥0.001). Other thresholds are contemplated herein for the probability P and vector similarity VS, including values greater than 0.001 or less than 0.001, and the threshold values can differ for the probability P and vector similarity VS from each other. These threshold values can be thought of as hyper-parameters and can be approximated using, for example, a grid search, as will be understood by those skilled in the art. The resulting world list can be, or can be included in the candidate word list. The RAILS model can be arranged to sort each word suggestion based on at least three parameters, including, for example, probability (P), vector similarity (VS), and phonetic distance (PD).

Table I depicts a non-limiting example of a structure of a candidate word list for the test case "and very consider it," where the selected candidate is "considerate." Although the correct candidate in this example ("considerate") does not have the highest probability or vector similarity, it has a phonetic distance of zero and is thus selected as the suggested replacement for the mis-transcribed word.

Table I:

TABLE I

Candidate Word List

| Candidate Token | Probability | Vector Similarity | Phonetic Distance |
|---|---|---|---|
| Professional | 0.053 | 0.00307 | 5 |
| Very | 0.053 | 0.0024 | 5 |
| Concise | 0.0013 | 0.0018 | 3 |
| Considerate | 0.0016 | 0.0028 | 0 |

The RAILS model can be arranged to suggest alternates beyond instances of homophone confusion. In addition to searching for probable homophones, the model can be arranged to suggest other probable words with overlapping phonemes. This flexibility can allow the model to catch instances such as "healthy"→"helpful" as these two words, while not homophonous, do share sounds. There are many such instances where reliance solely on homophony would fail.

Table II depicts a non-limiting example in which the RAILS model recovered the correct utterance. Table II:

TABLE II

Examples of Error Resolutions

| ASR | Verified | Algorithm's Error Resolution |
|---|---|---|
| She was very nice very polite very informal to | She was very nice very polite very informative | informal to → informative |
| She was very healthy | She was very helpful | healthy → helpful |
| I was really sad thank you | I was really satisfied thank you | sad → satisfied |
| She was very lean in to work with me | She was very willing to lean in work with me | lean in → willing |
| She was person to talk to and that's it | She was pleasant to talk to and that's it | person → pleasant |

In a non-limiting embodiment, the RAILS model can include one or more building blocks, including, for example: (1) a word embedding block comprising a word embedding for all the words contained in a dataset; (2) a trigram block comprising a trigram count containing all trigrams present in the dataset and their frequencies; and (3) a phonetic encoding block comprising phonetic similarity dataset containing phonetic similarities between lexical items in the dataset. The model can be arranged to determine phonetic similarity between lexical items.

The RAILS model can provide and facilitate substantial advances in big data processing, including, for example, identifying potential areas of difficulty in ASR systems, such as, for example, ASR engines, introduced by factors such as homophones and oronyms, or by factors such as a noisy or lossy channel. The RAILS model can be arranged according to the disclosure to correct and increase the accuracy of text generated by ASR engines. The RAILS model can provide for more robust language modeling for large text corpora generated by the ASR systems. The RAILS model can enable or facilitate a fully autonomous approach to detecting disambiguities or errors in ASR-generated transcripts, suggesting corrections and implementing corrections to create a true-to-life transcript with a WER value of 0.01 or less.

Referring to FIG. 3, in an embodiment of the Error Resolution Pipeline 55, the RAILS model (for example, in Transform 1) can work by examining the output of an ASR engine, which can include Kaldi, and finding regions of low confidence. A region can constitute a word. These regions can be subsequently presented to the BERT model (for example, in Transform 2), which can suggest improvements on the regions of low confidence. Alternatively, both the RAILS model and the BERT model can suggest or predict improvements on the regions of low confidence. These improvements can be sent to the word selector (for example, in Filter 2), which in turn can use a word selection algorithm such as decision trees to synthesize suggestions and produce a 1-best replacement hypothesis for a low confidence word (for example, Kaldi low confidence word).

While the Error Resolution Pipeline 55 (shown in FIG. 3) can be used with any ASR engine, including any general purpose ASR, Kaldi type ASR, Zamia ASR, or the like, the following non-limiting examples, which are provided solely for illustrative purposes, are discussed with respect to the general purpose ASR, Kaldi Api.Ai-based ASR, LibriSpeech-based ASR, and Zamia-based ASR.

In the following example, the confidence C of a region (K) that exhibits low confidence can be determined as follows:

$$C(K) \in \{x, -1\}, x \in \mathbb{R}: 0.0 \leq x \leq 1.0 \qquad \text{(Equation 4)}$$

where C(K) is the function that computes the confidence K, and where C(K) is either x or −1, and where x represents the confidence of an ASR engine in the rendering region K. This confidence can be calculated based on posterior probabilities in the decoding lattice. An exception to this is in the case of deleted regions that are represented as −1. In this setting, deleted words can be identified after aligning the ASR-generated transcripts with ground-truth human transcripts. After alignment leads to the identification of deleted words, they can be automatically marked with −1.

To improve K, the RAILS model can create R={$R_1, \ldots, R_N$}, an ordered N-best hypotheses set, where N≤10. The algorithmic filter can be provided R and using the BERT model, it can produce B={$B_1, \ldots, B_N$}, an ordered N-best hypotheses set (N=10). For both R and B, the first element in the set, $R_1$ and $B_1$, respectively, is of interest as this element is the hypothesis that represents the replacement region. Additionally, the original region, K, also remains a candidate hypothesis. Therefore, F∈{$R_1, B_1, K$} can refer to this final hypothesis that serves as a replacement region. {$R_1, B_1, K$} can be a multiset since it may contain multiple instances of the same element.

To evaluate the goodness of the final hypothesis F, an updated confidence function, C'(F), can be determined as follows:

$$C'(F) = \begin{cases} -1: & C(F) = \{-1\} \\ C(F)\setminus\{-1\}: & \text{otherwise} \end{cases} \qquad \text{(Equation 5)}$$

where C'(F) is defined in Equation 4. Equation 5 enumerates three potential outcomes of the Error Resolution Pipeline 55 comprising the RAILS model, BERT model and word selector (shown in FIG. 3) when applied to K, the region with low confidence:

C'(F)=C'(K): Here, the algorithm chooses F=K as the final hypothesis for the replacement region. In such an event, WER remains unchanged.

C'(F)>C'(K): Here, the algorithm chooses F={$R_1, B_1, K$}\{K}, i.e., it chooses either $R_1$ or $B_1$ as the final hypothesis for the replacement region. This choice is, in fact, correct, thus decreasing the WER.

C'(F)<C'(K): Here, the algorithm chooses F={$R_1, B_1, K$}\{K}, i.e., it chooses either $R_1$ or $B_1$ as the final hypothesis for the replacement region. This choice is incorrect, implying that the low confidence region, K, was the correct choice. Because we are using low confidence words as a proxy for error identification, there will be instances where these words were indeed correct, but the final replacement word suggested by the pipeline is erroneously applied. This will increase the WER.

In a non-limiting embodiment, the RAILS model can be trained using, for example, a subset of a corpus of 87,000 unique call records or any textual data derived from speech. The corpus can be received one record at a time or as one or more batches of records, each corresponding to a unique call session. Each record can include an original audio file containing a customer leaving voice survey responses about their experience with a call center agent and an ASR-generated transcript of each such call, annotated with word confidence scores. The call survey responses can vary in length from one word to more than 300 words. The survey can be free form, where the customer could respond in any way they saw fit.

Figure 5:
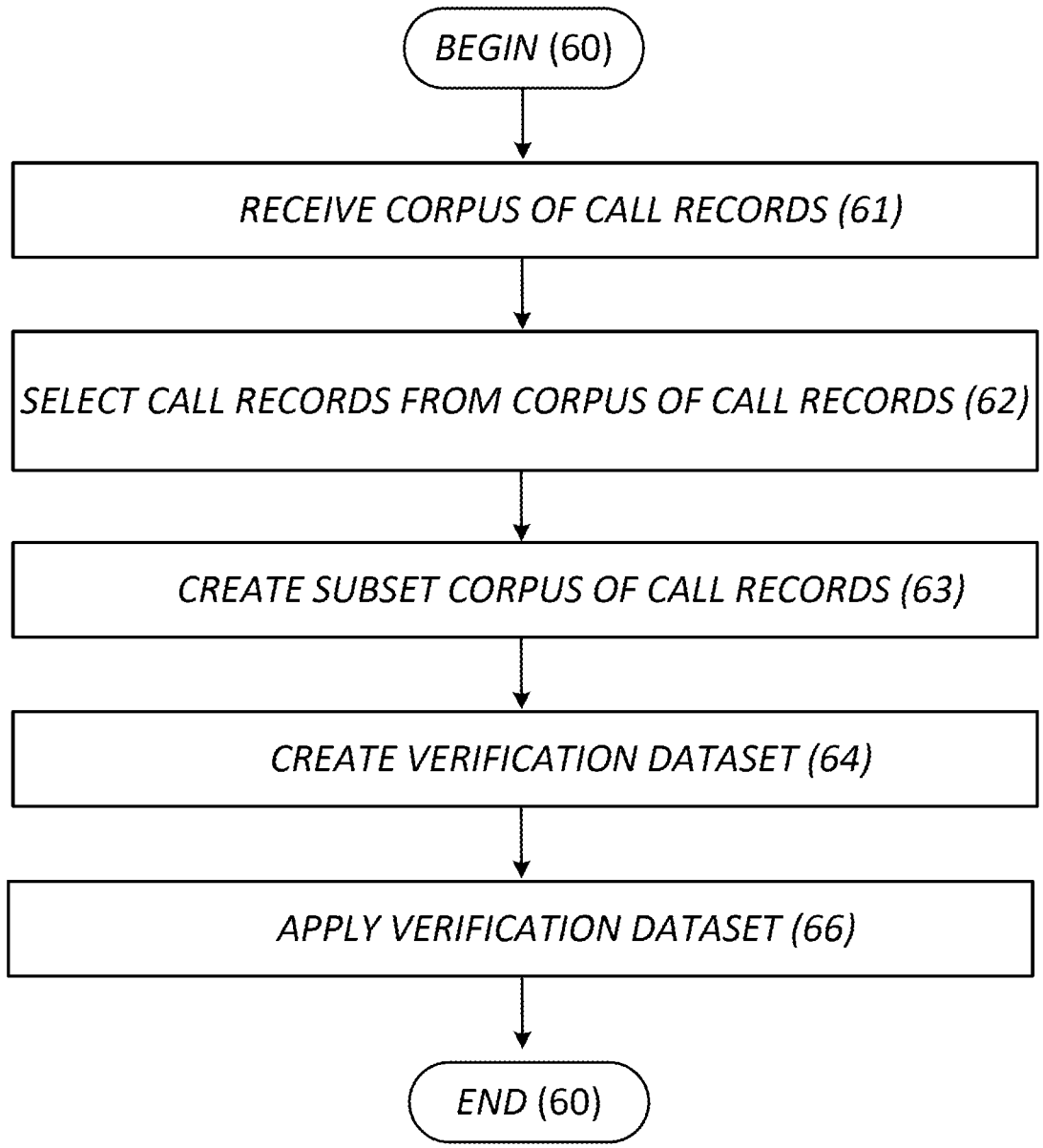
FIG. 5 shows an embodiment of a training process that can be used to train the RAILS model.

FIG. 5 shows a non-limiting embodiment of a training process 60 that can be used to train the RAILS model. The training process 60 can be carried out by, for example, the LPP system 100 (shown in FIG. 6).

In the above example, the corpus of 87,000 records can be received (Step 61) and a subset of call records can be selected (Step 62) and aggregated to create a subset corpus of call records (Step 63). The subset corpus can then be aggregated to form a verification dataset (Step 64). The subset corpus call records can be selected at random, for example, using a random-number-generator (not shown), or selected using any suitable selection scheme, as will be understood by those skilled in the art.

In the above example, 1,900 call records can be randomly selected (Step 62) from the corpus containing 87,000 call records and identified as the corpus subset (Step 63). Each call record in the corpus subset can contain a unique audio file and a corresponding ASP-generated transcript of the audio contained in the file, including word confidence scores.

When creating or updating the verification dataset (Step 64), the ASR-generated transcript can be analyzed while (or without) listening to the audio in each subset corpus call record and identifying any ambiguities or errors in the ASR-generated transcript. The comparison can be made by a verification transcriber such as an automated transcriber system (for example, one or more additional NLP systems, each being different) or a human transcriber. In the case of a human transcriber, both the audio and/or ASP-generated transcript can be rendered via, for example, a speaker (not shown) and/or a display (not shown), and annotations received from the human transcriber via a user interface (for example, IO interface 130, shown in FIG. 6). Each call record that contains an ambiguity or error can be annotated and updated to identify each mis-transcription and provide a correct word(s) to replace the mis-transcription.

Once all spoken content in each call record of the subset corpus has been analyzed and verified, and, where applicable, annotated, the data can be aggregated to create the verification dataset (Step 64). The verification dataset can be stored locally (for example, in a storage 120, shown in FIG. 6). Contemporaneously, or at a different time, the verification dataset can be applied to the RAILS model to update the parametric values of the model (Step 65).

Table III shows a non-limiting example for three call survey responses (Survey Numbers 2265, 2266, 2267) selected from the corpus subset containing 1,900 call records in the above example, including ASR-generated textual transcript and human-verified textual transcript for each response. In this example, the Survey Numbers range of 1 to 87,000. As seen below, the three survey responses each include both a human-verified transcript and an ASR-generated transcript that are made available for analysis. The corresponding call records each include an audio file of a customer leaving voice survey responses about their experience with a call center agent. The call survey can be free form, where the caller can respond to the customer survey in any way they deem fit.

Table III:

TABLE III

Examples of Call Survey Responses

| Survey Number | ASR Generated Transcript | Human Verified Transcript |
|---|---|---|
| 2265 | He was tentative and quick. | He was attentive and quick. |
| 2266 | She was very nice very polite very informal to. | She was nice very polite very informative. |
| 2267 | She was very healthy. | She was very helpful. |

In evaluating any discrepancies between the verified transcripts and the ASR-generated transcripts (in Step 63), an estimation can be made of the best alignment of the two transcripts for each call record. In this regard, the estimate the best alignment can be determined using, for example, the Needleman-Wunsch Algorithm, which finds the minimal set of insertions, deletions, and substitutions needed to transform the verified transcript into the ASR-generated transcript. From these alignments, an extraction of an implied set of word errors can be made. For example, if "informal to" was transcribed instead of the correct utterance, "informative", the error resulting error would be "informal to"→"informal".

In the non-limiting example with the subset corpus of 1,900 call records, the resulting error dataset contained 2,648 unique error types with a total of 6,438 errors made. An average of 4.4 errors per survey transcript was observed in this example. The highest frequency error was found to be the deletion of filler words with the most frequent being the deletion of "uh", which occurred 705 times. The second most common error type is the deletion of grammatical endings (for example, "she's"→"she", "helped"→"help"). The latter error type can be considered as not being a type of error for resolution as filler word, since it typically does not contribute to the interpretation of the utterance. The RAILS model can be trained to ignore errors related to grammatical endings such as, for example, where the use of morphemes results in different tenses of the same word. Often times such words can be reduced to a core root as a data prepossessing step. Thus, the RAILS model can be arranged to consider only substitution errors (for example, "card"→"car", "bill"→"bail") that do not include errors related to grammatical endings.

An evaluation of the RAILS model can be conducted using, for example, three pre-trained models, including Kaldi Api.Ai and LibriSpeech models, and a third model provided by Zamia. The Api.Ai model is the simplest of the models, trained on a mix consisting of English audiobooks and short commands ("Wake me up at 7 am"). The LibriSpeech model, consisting of a chain system based on TDNN (Time Delay Neural Net), consists of approximately 1,000 hours of audiobook content, carefully segmented and aligned. The third model from Zamia is the most resource intensive of the models, providing the best accuracy by being trained on about 1,200 hours of high quality, noise resistant audio. Like LibriSpeech, the Zamia model is also a large nnet3-chain factorized TDNN model. Table IV shows a comparison of these models.

Table IV:

TABLE IV

Comparison of Pre-Trained Models

| Model | Api.ai | LibriSpeech | Zamia |
|---|---|---|---|
| Training data (hours) | Api.ai logs, LibriSpeech corpus (unknown) | Audiobooks (960 h) | Various datasets (1200 h) |
| Type | nnet3 chain | TDNN chain | TDNN chain |
| Size | 177 MB | 2 GB | 609 MB |
| Words in vocabulary | 128 k | 200 k | 169 k |

The performance of ASR engines can be measured based on their WER value, which measures the percentage of incorrect words by adding up the total number of substitutions (S), insertions (I), and deletions (D) that occur in a sequence of recognized words, which can be determined by aligning any automatically generated transcriptions with the ground-truth, human transcriptions. Then, that number can be divided by the total number of words (N), resulting in the WER:

$$WER=(S+D+I)/N$$

The RAILS model can be developed and tested on, for example, a development/test split of Kaldi generated transcript datasets derived from the three pre-trained models: Api.Ai, LibriSpeech, and Zamia (See Table V). The development sets can be used to tune the parameters of the RAILS model and the word selection algorithm in the word selector (for example, in Filter 2, shown in FIG. 3).

Table V:

TABLE V

Development/Test Split for Each of 3 Model-Generated Transcripts

| | Dev | | Test | |
|---|---|---|---|---|
| Model Data | .wav Files | Words | .wav Files | Words |
| Api.Ai | 887 | 279,156 | 813 | 256,036 |
| LibriSpeech | 888 | 281,214 | 812 | 257,374 |
| Zamia | 888 | 278,553 | 812 | 274,938 |

The following discussion relates to the non-limiting embodiment of the Error Resolution Pipeline 55 (shown in FIG. 3) comprising the RAILS and BERT models in Filter 1 and a decision tree in the word selector in Filter 2.

The RAILS model is a real-time, automatic instantiation of an approach wherein, given a word with a low word confidence in a Kaldi-generated transcript, the model can suggest higher probability replacements. These probabilities can be generated on n-grams derived from the above example, in which the model is trained on a corpus of customer survey transcripts. Algorithmically, the RAILS model can be constructed from the building blocks: (1) a dataset containing all unigrams (1-gram), bigrams (2-gram), trigrams (3-gram), and quadgrams (4-grams) present in the corpus and their respective probabilities; and, (2) a phonetic encoding component, known as the match rating approach (MRA), which can be used to determine phonetic similarity between lexical items.

The RAILS model can be applied to words with low word confidence and, if the context is sufficient to make an alternate prediction, can use n-grams and phonetic distance measures to suggest an N-best list, $R=\{R_1, \ldots, R_N\}$, ($N \leq 10$). R can be null if the model does not find the present context among the trained n-grams. When R is not null, elements in the list are sorted by preference in terms of probability in context, i.e., the most preferred element is in $R_1$. The RAILS model can be applied in an iterative fashion from the beginning to the end of each transcript in an effort to resolve errors that result in ill-formed, incorrect, or nonsensical segments.

The BERT model is a language representation model using a transformer network trained on large text corpora. As of the date of this writing, BERT achieved state-of-the-art performance on various NLP tasks. Processing an input text with certain words masked out, it can make predictions on the masked words by extracting contextual information from all surrounding text.

The BERT model can be arranged to complement the RAILS model result. Using the pre-trained BERT Large Masked Language Model (MLM) without fine-tuning, for each low confidence word K in a Kaldi transcript, an ordered N-best hypothesis set $B=\{B_1, \ldots, B_N\}$, (N=10) can be generated as potential replacement candidates. Like the RAILS model, elements in B can be sorted by probability in context, for example, the highest probability element can be in $B_1$.

The word selector (for example, in Filter 2, shown in FIG. 3) can include a word selection algorithm developed through a decision tree model. For a given low confidence word K in a Kaldi transcript, if both ordered hypothesis sets from the RAILS model, R, and BERT model, B, are available, then it is possible to select a final hypothesis (word) F in place of K that results in a higher probability of matching the ground truth (human transcription) than always using $R_1$ or $B_1$ alone. Therefore the problem is reduced to specifying a word selection algorithm that chooses $F \in \{R_1, B_1, K\}$ in place of K to minimize WER.

The word selection algorithm can be developed with the assistance of R and B, and their intersection $T = R \cap B = \{T_1, \ldots, T_n\}$, ($n \leq N$), with the same element ordering as R. The set T can be chosen to add more variance and to better generalize the decision trees. Consider $R=\{a, b, c, f\}$, and $B=\{x, b, y, f\}$; then, $T=\{b, f\}$. Clearly, $T_1=b$ can be considered as a high probability candidate by both RAILS and BERT models, thus allowing it as a possible response seems appropriate. In a sense, $T_1$ can act as an arbiter to further increase the confidence that F has a high probability of being correct. To observe this, note that $F \in \{R_1, B_1, K\}$ implies that if K is not chosen as the final response, then there is no reliable arbiter to determine which of $R_1$ or $B_1$ should be chosen. Elements in T have a high probability of being correct since they appear in both lists, R and B. Thus, $T_1$ can be considered an arbiter by observing which of $B_1$ or $R_1$ matches it, and then considering the matched element to be the final response.

In developing the word selection algorithm, one choice can be to use decision tree learning methods. However, the word selection algorithm in the word selector can be developed using other machine learning methods, including, for example, Random Forests. Decision trees are versatile learning models for which it is intuitive to observe how a decision tree reached a decision. In the instant case, a multi-class decision tree can be created that predicts the class of $F \in \{R_1, B_1, K\}$. To train the decision tree model, 15 Boolean features can be created, shown in Table VI. These features can be categorized into three categories: word validation, word comparison, and word membership.

Table VI:

TABLE VI

Input (Boolean) Features for Decision Tree

| Word Validation | Word Comparison | Word Membership |
|---|---|---|
| K = ∅ | K = $R_1$ | K ∈ R |
| $R_1$ = ∅ | K = $B_1$ | K ∈ B |
| | $R_1$ = $B_1$ | $R_1$ ∈ B |
| | K = $T_1$ | $B_1$ ∈ R |
| | $R_1$ = $T_1$ | K ∈ T |
| | $B_1$ = $T_1$ | $R_1$ ∈ T |
| | | $B_1$ ∈ T |

Word validation can determine whether K and $R_1$ are null. Note that there is no check for $B_1$=∅ because unlike the RAILS model that can return R={∅} if it does not find the appropriate context in the n-grams, the BERT model always returns a non-null N-best list, B. Word comparison can create features from exhaustively exploring the symmetric pairings of each element in $\{R_1, B_1, K\}$, with an additional three features that can capture the pairing of $\{R_1, B_1, K\}$ with $T_1$. Word membership can create binary features by exhaustively examining the membership of the response variables $\{R_1, B_1, K\}$ in the sets R, B, and T. Human transcription can be used as the ground truth for training the decision tree, and a missing word in Kaldi transcription can be represented as NULL (∅).

The word selection algorithm can be constructed by training a decision tree model as described next. First, the dataset can be partitioned into dev and test (see Table IV). Each audio file in the dev partition can be considered an utterance, which can be examined for low confidence words. Each low confidence word can become a new training vector that can contain the 15 attributes in Table VI and the response variable. Thus, one utterance can generate multiple training (and later, testing) vectors. A representative word selection algorithm learned from a decision tree is shown in Algorithm 1.

Algorithm 1:

```
Algorithm 1 Decision tree word selection algorithm for (all utterances) do
    while (low confidence regions exist in utterance) do
        K ← region of low confidence
        R ← RAILS(K)        ▷ RAILS suggestions for K
        B ← BERT(K)         ▷ BERT suggestions for K
        T ← R ∩ B
        F ← PREDICT_RESPONSE(R, B, K, T)
    end while
end for
function PREDICT_RESPONSE(R, B, K, T)
    if K = ∅ then                           ▷ Deletion
        if (R₁ = ∅) or (B₁ ∈ R and B₁ ≠ T₁) then
            F ← B₁
        else
            F ← R₁
        end if
    else                                    ▷ Subtitution
        if R₁ ∈ T and K ≠ B₁ then
            F ← R₁
        else
            F ← K
        end if
    end if
    return F
end function
```

Example 1

In a non-limiting example, an embodiment of the RAILS model was tested on transcriptions generated by three different models used in ASR engines, namely the Kaldi Api.Ai model, the LibriSpeech model and the Zamia model (see Table V). In this example, the Kaldi Api.Ai model saw a 1.1% improvement in overall WER when only the RAILS model was applied (see Table VII). This improvement was largely a result of bringing the deletion rate down by 8%. The substitution rate, however, went up. There were instances where the RAILS model was applied on correct Kaldi transcriptions with low word confidence, which resulted in a higher substitution WER. The RAILS model was applied to all words with a confidence of 0.60 or less, the threshold found to be optimal for this model data. This threshold was optimized to maximize the number of correct replacements and minimize the number of incorrect replacements of words with low word confidence. Of all words below this threshold on which the RAILS model was applied, some were correctly changed, some were incorrectly changed, and some remained unchanged if the context was not sufficient to suggest an alternative. Thus, while we see 8% gains in the deletion rate, this was partially negated by the increase in substitution error rates, or mis-corrections. Further, some increases in the substitution rate can be attributed to deletion errors being moved to substitution errors in cases where the RAILS model hypothesis for the deleted word in the Kaldi transcript does not match the ground truth.

Table VII:

TABLE VII

Performance of RAILS Model in Filter 1 for each Kaldi Model

| ASR Model | Filter Model | WER | Corrected | Mis-Corrected | Net Corrected |
| --- | --- | --- | --- | --- | --- |
| Api.Ai (Base WER: 0.492) | RAILS | 0.481 | 539 | 411 | 128 |
| Librispeech (Base WER: 0.443) | RAILS | 0.436 | 380 | 301 | 79 |
| Zamia (Base WER: 0.317) | RAILS | 0.303 | 307 | 69 | 238 |

The LibriSpeech model saw a 0.07% improvement in overall WER values after application of the RAILS model (see Table VII). As was the case with the Api.Ai model, the substitution rate increased. It did not, however, increase the substitution errors at nearly the same rate as in the Api.Ai model data. In this model data, the RAILS model was applied to all words with a confidence of 0.50 or less, which was the threshold found to be optimal for this example and model data.

The Zamia model saw a 1.4% absolution improvement in overall WER values after application of the RAILS model (see Table VII). Under this regime, the RAILS model was applied to all words with a confidence of 0.40 or less, the optimal threshold determined for this example and data. This was observed to be the lowest word confidence threshold of any model in this particular example, as it was the model with the lowest WER. Once again, the gains in WER were limited by the rate of mis-substitutions. This characteristic was, however, addressed by inclusion of a second transform model—the BERT model—in an effort to decrease the rate of mis-corrections.

Example 2

In another non-limiting example, an embodiment of the BERT model was tested on transcriptions generated by the same three models, namely the Kaldi Api.Ai model, the LibriSpeech model and the Zamia model. The pre-trained BERT model was used without fine-tuning on any dataset and, therefore, was found not to be as accurate as the RAILS model. The results of using BERT as the only model in Filter 1 (shown in FIG. 3) are shown in Table VIII. Compared to using the RAILS model, the BERT model demonstrated a consistent increase in WER when the verification dataset (discussed above) was fit with the BERT model. An interesting aspect of the BERT model's performance is shown in the last column in Table VIII, which can explain an increase in WER observed in this example. For the less complex ASR models (Api.Ai and LibriSpeech), the BERT model's net corrected was negative, while for the complex Zamia ASR model it was positive. This suggests that the BERT model works best when the neighboring words are contextually accurate. Because the less complex ASR models make more mistakes on the average, the context that the BERT model needs to correct errors is not as robust as it is for the more complex ASR models.

Table VIII:

TABLE VIII

Results Appended with BERT Model

| ASR Model | Filter Model | WER | Corrected | Mis-corrected | Net Corrected |
| --- | --- | --- | --- | --- | --- |
| Api.Ai (Base WER: 0.492) | RAILS | 0.481 | 539 | 411 | 128 |
| | BERT | 0.494 | 397 | 526 | −129 |
| Librispeech (Base WER: 0.443) | RAILS | 0.436 | 380 | 301 | 79 |
| | BERT | 0.450 | 255 | 381 | −126 |
| Zamia (Base WER: 0.317) | RAILS | 0.303 | 307 | 69 | 238 |
| | BERT | 0.311 | 197 | 99 | 98 |

In Table VIII, the results were obtained using the same word confidence thresholds that were optimized for achieving the best RAILS model results. However, these thresholds did not appear to affect the results from the BERT model in any quantitative manner since the purpose-trained RAILS model was more effective for the particular application than the pre-trained BERT model. The contribution of the BERT model becomes apparent when the word selector in Filter 2 (shown in FIG. 3) is applied to the output from the BERT model.

A significant benefit of the Error Resolution Pipeline 55 (shown in FIG. 3) becomes evident when processing occurs in Filter 2. In this filter, the N-best list from the BERT model can be used in combination with the N-best list from the RAILS model. The algorithms that perform these combinations and select a word can be derived from training a decision tree model as discussed above. In an embodiment, three decision tree models are induced—one for each of the above-discussed ASR models (i.e., Kaldi Api.Ai, LibriSpeech, and Zamia). The three decision tree models can be induced on the dev set and fitted to the observations derived from the test set (see Table V). The results from fitting the decision trees to the test set in terms of WER and associated information are summarized in Table IX. In Table IX, DT-A refers to the learned decision tree for the Api.Ai model, DT-L refers to the learned decision tree for the LibriSpeech model, and DT-Z refers to the learned decision tree for the Zamia model.

Table IX:

TABLE IX

Results Appended with Decision Tree Models

| ASR Model | Filter Model | WER | Corrected | Mis-corrected | Net Corrected |
|---|---|---|---|---|---|
| Api.Ai | RAILS | 0.481 | 539 | 411 | 128 |
| (Base WER: | BERT | 0.494 | 397 | 526 | −129 |
| 0.492) | DT-A | 0.467 | 503 | 52 | 451 |
| Librispeech | RAILS | 0.436 | 380 | 301 | 79 |
| (Base WER: | BERT | 0.450 | 255 | 381 | −126 |
| 0.443) | DT-L | 0.427 | 309 | 25 | 284 |
| Zamia (Base | RAILS | 0.303 | 307 | 69 | 238 |
| WER: | BERT | 0.311 | 197 | 99 | 98 |
| 0.317) | DT-Z | 0.300 | 325 | 9 | 316 |

As seen in Table IX, while the RAILS model was observed to correct 539 low-confidence regions in the Api.Ai model in this particular example, it also made 411 errors. These errors were found to be a result of the originally correct transcription word (K) being replaced by incorrect RAILS model 1-best hypothesis ($R_1$) in regions of low confidence. The selection function induced by the training a decision tree (indicated by the row DT-A), demonstrated that the mis-corrections were reduced by a factor of 8 (or 800%) when compared to the mis-corrections made by the purpose-trained RAILS model. Using a decision tree word selection algorithm brought the mis-corrections down to 52 (from 411). This also has the serendipitous side effect of increasing the net corrected by approximately 350% (or a factor of 3.5) compared to the bespoke RAILS model. The net result of the application of Filter 2 (shown in FIG. 3) is that the Error Resolution Pipeline 55 (shown in FIG. 3) decreased the WER from the Api.Ai model base WER of 0.492 to 0.467 when using the decision tree word selection algorithm, a decrease of 0.025 (or 2.5%) in absolute terms. r Similarly, the decision tree word selection algorithm for the LibriSpeech ASR model was observed to reduce the mis-corrections by a factor of 12 (or 1200%, from 301 mis-corrected when using RAILS model to only 25 mis-corrected when using DT-L, and the WER decreased by 0.016 (or 1.6% absolute, from a base of 0.443 to 0.427). The decision tree word selection algorithm for the Zamia ASR model reduced the mis-corrections by a factor of 7 (or 700%, from 69 mis-corrected when using RAILS model to only 9 mis-corrected when using DT-Z), and the WER decreased by 0.017 (or 1.7% absolute, from a base of 0.317 to 0.300) when using DT-Z.

A second observation becomes apparent in the WER decrease as the ASR models become more complex. The Zamia ASR model, the most complex of the three, has a WER of 0.317. However, even at this WER, the Error Resolution Pipeline 55 (shown in FIG. 3) was able to further decrease the WER to 0.300 when using the decision tree selection function, a decrease of 0.017 (or 1.7%) absolute.

The WER for each ASR model was found to be a function of the complexity and size of the model's training. The more complex the model, the less error it was found to make leading to a smaller WER, as seen in Table IX. Consequently, for each of the three ASR models tested, the distribution represented by the regions of low confidence were found to be different, and each such distribution can be treated as an independent dataset on which to train a decision tree.

As seen in the above examples, the decision trees were able to reduce the WER between 1.6% to 2.5% absolute, depending on the ASR model. Further improvements in WER are expected, especially where the Error Resolution Pipeline 55 is provided with a feedback mechanism such the machine learning platforms can learn and parametric values in the models update to increase prediction accuracy over time.

For the Api.Ai model, the decision tree was able to reduce the mis-corrections by 800%. Thus, clearly, the decision trees contribute to the reduction of the WER and to the associated increase in the accuracy of the generated transcript. However, if the traditional performance measures associated with decision trees (accuracy, precision, and recall) are examined, it is discovered that they do not quite reflect the gains in performance observed in the examples discussed above. For instance, the overall accuracy for the decision trees induced on the dev partition and fit to the test partition is shown in Table X.

Table X:

TABLE X

Decision Tree Accuracy for ASR Models

| | Low confidence observations | Decision tree matches ground truth | Decision tree accuracy (%) |
|---|---|---|---|
| Api.Ai | 7.888 | 1.677 | 21.3 |
| LibriSpeech | 5.540 | 1.296 | 23.4 |
| Zamia | 3.375 | 563 | 16.7 |

As seen in Table X, traditional accuracy measures alone may not be very high. However, just as clearly, the above examples demonstrate that the decision trees can have a large impact on reducing mis-corrections, as well as the overall reduction in the WER. A new performance measure can be included, "predictive utility" (discussed below), to evaluate the contribution of decision tree as a word selection algorithm in the Error Resolution Pipeline 55 (shown in FIG. 3).

Referring to the earlier example, with 15 binary features that were extracted from the training dataset and decision trees trained, the shape of the training data can be M×15, where M is 2067, 1585, and 734 for the Api.Ai, LibriSpeech, and Zamia models, respectively. Theoretically, for 15 binary features, a decision tree may need to be trained on 215=32, 768 observations to learn all patterns. However, even if such a training corpus were to be available, it would may not help because, for many observations, the response variable F∈{$R_1$, $B_1$, K} may not match the human transcribed ground truth, for example, none of $R_1$, $B_1$, or K matches the ground truth.

In this example, the training datasets contained only between 2% to 6% of the theoretical number of observations from which to find patterns and generalize. The low number of training observations occurred primarily because samples for training can only be used where one of {$R_1$, $B_1$, K} matches the human transcribed ground truth. For most of the low confidence regions in the dev partition on which the trees are trained, none of {$R_1$, $B_1$, K} matches the ground truth. Thus, with training occurring on an extremely small subset of observations, traditional decision tree performance measures like accuracy will suffer. However, an aim of the disclosure can include extracting enough residual information from the predictions of the decision tree to aid in lowering the overall WER.

To measure the impact that the decision trees have on the Error Resolution Pipeline 55 (shown in FIG. 3), the predictive utility can be employed. The predictive utility can be determined as follows:

$$P = \frac{|D|}{|A|} * 100 \quad \text{(Equation 6)}$$

Here, D is a multiset defined as follows:

$$D = \forall w \in \{\text{low confidence region}\}\{d_w | d_w = \text{Truth}\} \quad \text{(Equation 7)}$$

where $d_w$ is the predicted output of the decision tree on a low confidence word w, and $d_w$ matches the ground truth (Truth). A is a multiset defined as follows:

$$A = \forall w \in \{\text{low confidence region}\}\{a_w | a_w = \text{Truth}\} \quad \text{(Equation 8)}$$

In order for $a_w$ to be included in A, one of the following conditions must hold:

$a_w = R_1 = \text{Truth}$: $a_w$ must be equal to the RAILS model 1-best hypothesis for w, which must be equal to the ground truth; or $a_w = B_1 = \text{Truth}$: $a_w$ must be equal to the BERT model 1-best hypothesis for w, which must be equal to the ground truth; or $a_w = K = \text{Truth}$: $a_w$ must be equal to K, the word chosen by Kaldi, and K must be equal to the ground truth.

Table XI shows an example of the predictive utility, P, for each of the three models discussed above: Table XI:

TABLE XI

Measuring Impact of Decision Trees

| | A (RAILS or BERT or KALDI matches ground truth) | D (Decision Tree matches ground truth) | P (Predictive utility, %) |
|---|---|---|---|
| Api.Ai | 2,048 | 1,677 | 81.9 |
| LibriSpeech | 1,556 | 1,296 | 83.3 |
| Zamia | 687 | 563 | 82.0 |

As may be apparent from the above, without a decision tree selection algorithm to guide the choice of a specific element to choose from $\{R_1, B_1, K\}$, any one of these has an equal probability of being chosen. For the Api.Ai ASR model, there are 2,048 observations in the example where one of these elements matches the ground truth, but it is not clear which one to choose. The decision tree is able to correctly predict 1,677 of these observations, leading to a predictive utility of 81.9%. Similar analysis applies for the remaining two ASR models. Despite the complexity of the ASR model being used, the decision tree word selection algorithm improves the predictive utility by an average of 82.4%.

The benefits of the Error Resolution Pipeline 55 (shown in FIG. 3) are numerous, including, for example: it provides a solution to mis-transcriptions that does not require training any deep learning models; the process is fully automated, not requiring any human intervention; and the system is easy to set up and operate. The Error Resolution Pipeline 55 can take advantage of advances in attention-based transformer models by seamlessly integrating powerful, pre-trained models like BERT. It can also treat the ASR engine as a black box, and only require that it output a word confidence score as part of the decoding to detect potential word errors.

The Error Resolution Pipeline 55 can be applied in an independent, post-hoc fashion. This approach is unique in the realm of domain-adaptation in that the ASR errors can arise largely from a lossy or noisy channel, rather than errors resulting from deploying the ASR system on an out-of-domain vocabulary.

In another non-limiting embodiment, additional training can be provided to the Filter 1 or Filter 2 in the Error Resolution Pipeline 55, including, for example, n-gram model and decision tree model training.

In another non-limiting embodiment, the Error Resolution Pipeline 55 (shown in FIG. 3) can include additional models in Filter 1. For instance, attention-based transformer models can be added and seamlessly integrated, including, for example, pre-trained deep bi-directional language models like XLNET and GPT-3. The pipeline architecture makes it easy to integrate new, pre-trained models.

The operations of the models in Filter 1 can be easily parallelized; each model can independently create an N-best hypotheses set from a given transcript and send its output to Filter 2. Such an architecture can be highly amenable to a map-reduce computing paradigm, where all the maps can be done in parallel.

The optimal word confidence threshold for BERT can be optimized by, for example, optimizing the hyper-parameter to allow the BERT model to further contribute in Filter 2. The word threshold hyper-parameter can be learned through a grid search while training the RAILS model, and reused as the same word confidence threshold for the BERT model.

Figure 6:
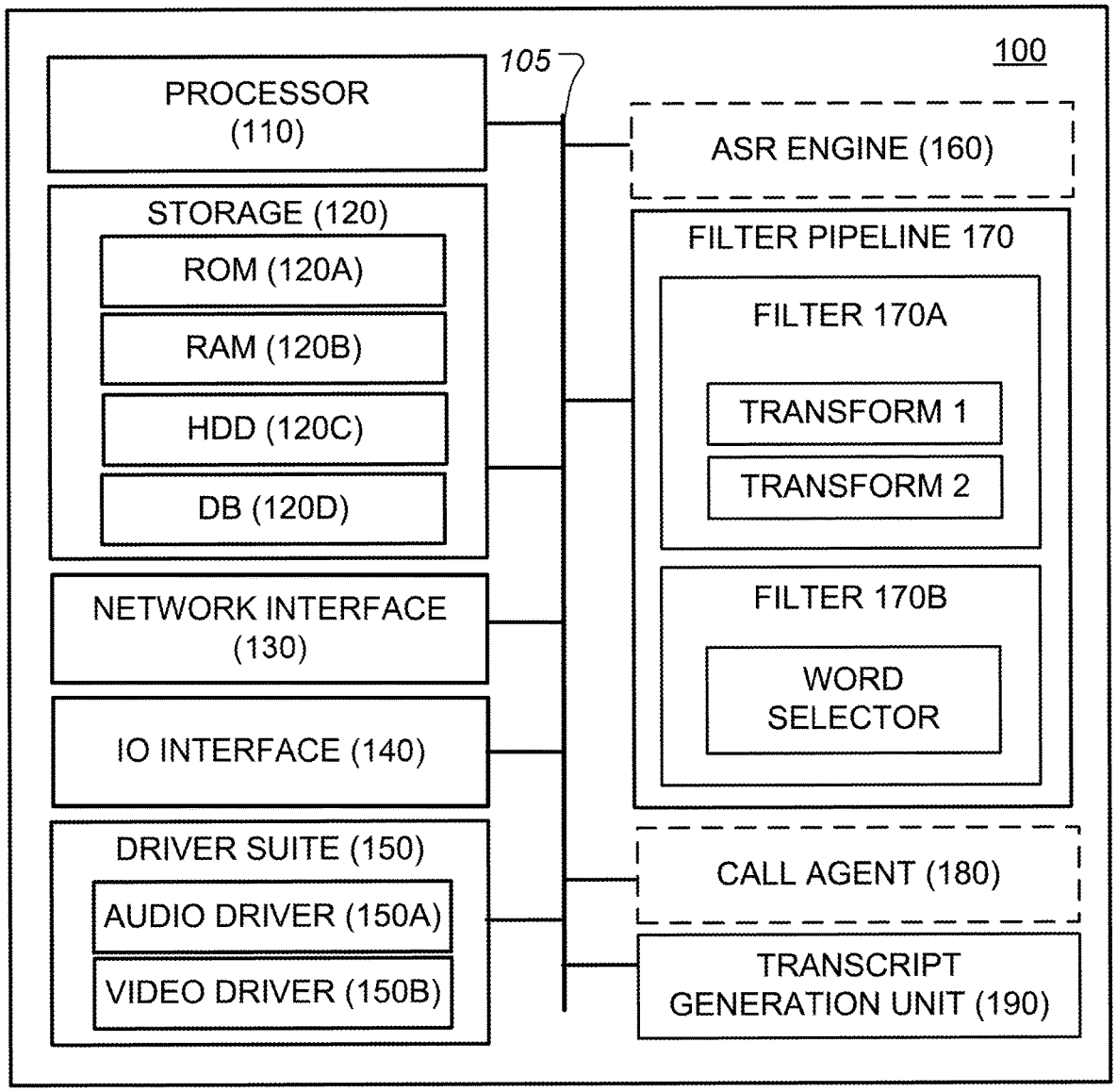
FIG. 6 shows an embodiment of an Error Resolution Pipeline Processor (LPP) system.

FIG. 6 depicts a non-limiting embodiment of the Error Resolution Pipeline Processor (LPP) system 100, constructed according to the principles of the disclosure. The LPP system 100 can include a processor 110, a storage system 120, a network interface 130, an input-output (IO) interface 140, and a driver unit 150. The LPP system 100 can (optionally) include an ASR engine 160. The LPP system 100 can include a filter pipeline 170. The LPP system 100 can (optionally) include a call agent 180. The LPP system 100 can include a transcript generation unit. The LPP system 100 can include a modem (not shown), a transmitter (not shown), a receiver (not shown), or a transceiver (not shown). The LPP system 100 can include a bus 105 that can connect to each of the components 110 to 190 in the system 100 via one or more communication links.

The LPP system 100 can include a non-transitory computer-readable storage medium that can hold executable or interpretable computer resources, including computer program code or instructions that, when executed by the processor 110, cause the steps, processes or methods in this disclosure to be carried out. The computer-readable storage medium can be included in the storage 120.

The ASR engine 160 can be included in applications, such as, for example, where the LPP system 100 receives untranscribed audio files or audio signals and it is desirable to have the LPP 100 transcribe the received speech to text. The ASR engine 160 can be configured similar to the ASR engine 1 (shown in FIG. 1), as a general purpose ASR engine. The ASR engine 160 can include Kaldi-type models, Zamia models, or any other suitable ASR system.

The LPP system 100 can comprise the call agent 180, which can be arranged to interact with one or more of the communication devices 10, the call center 30 or an agent communication device 40 (shown in FIG. 2). The call agent 180 can be arranged to connect and establish a call session between two or more user communication devices 10 or between a user communication device 10 and the call center 30 or an agent communication device 40. The call agent 180 can be arranged to carry out all appropriate pre-call steps, including any steps necessary to ensure that a caller request communicated by or via the user communication device 10 can be resolved during a call session, or that a customer survey can be recorded and transcribed.

Any one or more of the components 130 to 190 can include a computing device or a computing resource that is separate from the processor 110, as seen in FIG. 65, or integrated or integratable in a computing device such as the processor 110.

Any one or more of the components 150 to 190 can include a machine learning platform, including, for example, one or more supervised machine learning platforms or one or more unsupervised machine learning platforms. The machine learning platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a Transformer neural network, a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for searching or analyzing plaintext and detecting or predicting plaintext credentials. The machine learning platform can include one or more machine learning (ML) models that can analyze ASR-generated transcripts, identify or predict ambiguities or erroneous word transcriptions, determine or predict replacement words or corrections that can correct or resolve the identified ambiguities or erroneous word transcriptions. The model(s) can be arranged to evaluate the performance of the ASR system used to generate the ASR-generated transcripts. The model(s) can be arranged to identify each incorrect word or ambiguity and replace or resolve it such that the modified transcript is an accurate rendering of the spoken words, with a WER of, for example, between 0.016 and 0.025, or less.

In a non-limiting embodiment, the components 110 to 160 can include existing components in the user communication device 10 (shown in FIG. 2), the call center 30 (shown in FIG. 2) or the agent communication device 40 (shown in FIG. 2), and the components 160 to 190 can be added to or installed therein or thereon as one or more computing resources or computing devices.

The processor 110 can include any of various commercially available processors, including for example, a central processing unit (CPU), a graphic processing unit (GPU), a general-purpose GPU (GPGPU), a tensor processing unit (TPU), a field programmable gate array (FGPA), an application-specific integrated circuit (ASIC), a manycore processor, multiple microprocessors, or any other computing device architecture.

The processor 110 can be arranged to run an operating system, which can include an operating system kernel to control all operations on the LPP system 100. The operating system kernel can include, for example, a monolithic kernel or a microkernel. The kernel can be arranged to execute on the processor 110 and have control over operations in the system 100. The operating system and/or kernel can be contained in the storage 120 and executed by the processor 110. The operating system and/or kernel can be cached in a RAM 120B (discussed below). The kernel can represent the highest level of privilege on the operating system or the processor 110. The operating system can include a driver for each hardware device included in the LPP system 100.

The storage system 120 can be arranged as one or more computing devices or computing resources. The storage system 120 can include a read-only-memory (ROM) 120A, a random-access-memory (RAM) 120B, a hard disk drive (HDD) 120C and a database (DB) 120D. The storage 120 can include the non-transitory computer-readable storage medium that can hold the executable or interpretable computer program code or instructions that can be executable on the processor 110 to cause the steps, processes or methods in this disclosure to be carried out. The computer-readable storage medium can be included in, for example the HDD 120C. In alternative non-limiting embodiments wherein one or more of the components 160 to 190 consists solely of computer resources, the computer-readable storage medium can include the ASR engine 160, the filter pipeline 170, the call agent 180 or the transcript generation unit 190.

The storage 120 can include one or more application programs, application program interfaces (APIs), computer program modules, or program data. The APIs can include, for example, a web API, a simple object access protocol (SOAP) API, a remote procedure call (RPC) API, a representation state transfer (REST) API, or any other utility or service API.

A basic input/output system (BIOS) can be stored in a non-volatile memory in the storage 120, such as, for example, the ROM 120A, which can include, for example, a ROM, an EPROM, or an EEPROM. The BIOS can contain the basic routines that help to transfer information between components in the system 100, such as during start-up.

The RAM 120B can include a high-speed RAM such as a static RAM (SRAM) or non-volatile random-access memory (NVRAM) for caching data.

The HDD 120C can include, for example, a hard disk drive (HDD), an optical disk drive (ODD), an enhanced integrated drive electronics (EIDE) drive or a serial advanced technology attachments (SATA) drive. The HDD 120C can include a read/write from/to a CD-ROM disk (not shown), or, read from or write to other high capacity optical media such as a digital versatile disc (DVD). The HDD 120C can be arranged for external use in a suitable chassis (not shown). The HDD 120C can be arranged to connect to the bus 105 via a hard disk drive interface (not shown) or an optical drive interface (not shown). The hard disk drive interface (not shown) can include a Universal Serial Bus (USB) (not shown) or an IEEE 1394 interface (not shown) for external applications.

The DB 120D can be arranged to store call records that are generated in a user environment, such as, for example, the communication environment (shown in FIG. 2). The DB 120D can be populated with any number of call records (e.g., millions, billions, trillions, etc.). Each call record can include details about the corresponding call, a recording of the call (for example, a .wav file) and an ASR-generated transcript of the call. The ASR-generated transcript can include annotations or word confidence scores. The transcript can include a textual transcript of all words or utterances spoken during the call. The call details can include, for example, information about call setup, call progression, information about the caller, information about the interactive voice response (IVR) application that answered the call, direction of call (e.g., inbound, outbound, internal), how the call terminated, total time duration of the call, connected duration of the call, how the caller navigated the IVR, DTMF presses, application states, speech analytics and outputs from various digital signal processor (DSP) modules (not shown). The DB 120D can be arranged to contain candidate word lists, phonetic encoded candidate word lists, homophone lists, trigram lists, and oronym lists.

The DB 120D can be arranged to be accessed by any one or more of the components 110 to 190 in the LPP system 100. The DB 120D can be arranged to receive a query and, in response, retrieve specific data or files (including, for example, .wav files), data records or portions of data records based on the query. A data record can include, for example, a file or a log. The DB 120D can include a database management system (DBMS) that can interact with the components 110 to 190. The DBMS can include, for example, SQL, NoSQL, MySQL, Oracle, Postgress, Access, or Unix. The DB 120D can include a relational database.

The network interface 130 can be arranged to connect to the network 20 (shown in FIG. 2). The network interface 130 can include a wired or a wireless communication network interface (not shown) or a modem (not shown). When used in a LAN, the network interface 130 can be arranged to include a wired or wireless communication network interface that can connect to the LAN; and, when used in a wide area network (WAN), the network interface 130 can be arranged to include a modem to connect to the WAN network. The modem (not shown) can be internal or external and wired or wireless. The modem can be connected to the bus 105 via, for example, a serial port interface (not shown).

The IO interface 140 can be arranged to receive commands or data from an operator (not shown) or one or more of the components 110 to 130 or 150 to 190. The IO interface 140 can include a voice user interface. The IO interface 140 can be arranged to connect to or communicate with one or more input/output devices (not shown), including, for example, a keyboard (not shown), a mouse (not shown), a pointer (not shown), a microphone (not shown), a speaker (not shown), or a display (not shown). The received commands or data can be forwarded from the IO interface 140 as instruction or data signals via the bus 105 to any component in the system 100.

The driver unit 150 can include an audio driver 150A and a video driver 150B. The audio driver 150A can include a sound card, a sound driver (not shown), an interactive voice response (IVR) unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The call agent 180, when included, can include a conversation BOT, such as, for example, an autonomous computer program that can interact with a user using spoken words. The call agent 180 can be arranged to communicate with the user communication device 10 (shown in FIG. 2), call center 30 (shown in FIG. 2) or agent communication deice 40 (shown in FIG. 2) and interact with a human operator at the device using spoken words. The call agent 180 can be arranged to record each call session and store an uncompressed (or compressed) audio file of the call (for example, in .wav format) together with call details in the storage 120—for example, in the DB 120D.

The ASR engine 160, when included, can be arranged to analyze and transcribe all speech during a call using natural language processing, and to create a textual transcription of the call, including each spoken word or utterance. In a non-limiting embodiment, the call agent 180 can be arranged to allow a caller (via the communicating device 10, shown in FIG. 2) to describe his/her needs, complete a customer survey or interact with a human user or the IVR using any preferred terminology. The ASR engine 160 can analyze, transcribe and create a textual transcript of each word spoken during the call.

Once a call session is established and a voice connection made to a communication device 10, voice and speech analysis can be carried out by the ASR engine 160 and a textual transcript of the spoken words can be created and stored in the storage 120. The call session can include, for example, a customer call survey, an Internet search query, or a spoken command.

The filter pipeline 170 can include the Error Resolution Pipeline 55 (shown in FIG. 3). The filter pipeline 170 can include a suite of computing devices or computer resources, such as, for example, the filter 170A and the 170B, which can include the Filter 1 and the Filter 2 (shown in FIG. 3), respectively. Filter 170A can include transforms Transform 1 and Transform 2, which can include the RAILS model and the BERT model, respectively. Transform 1 and Transform 2 can be arranged as discussed above, with respect to Error Resolution Pipeline 55 (shown in FIG. 3). Filter 170B can include the word selector in the Error Resolution Pipeline 55, including a word selector such as, for example, decision tree, random forest, or random decision forest. The filter 170B can be arranged in series with the filter 170A, as discussed above with respect to Filter 1 and Filter 2 (shown in FIG. 3).

In a non-limiting embodiment, the filter pipeline 170 can be implemented as one or more computer resources that are executable by the processor 110, including, for example, the filters 170A and 170B. In the embodiment, the filter pipeline 170 can be stored in the storage 120 and executed by the processor 110. The computing resources can execute on different computing devices, such as, for example, computing resources on different cloud platforms.

In a non-limiting embodiment, the filter pipeline 170 can be downloaded to or installed on a computing device, such as, for example, in the user communication device 10 (shown in FIG. 2), the call center 30 (shown in FIG. 2) or the agent communication device 40 (shown in FIG. 2).

The transcript generation unit 190 can be arranged to process the corrected transcript output from the filter pipeline 170, convert it to a suitable form (for example, based on the destination computing resource), and send the resultant transcript to a computing resource or a communication device, such as, for example, the communication device 10 (shown in FIG. 2).

The non-limiting embodiments of the system and method disclosed herein can be implemented in a variety of applications, including, for example, in BigData processing and analysis, as well as other BigData efforts. The LPP system 100 (shown in FIG. 6) can be arranged, for example, to evaluate an ASR-generated transcript from an ASR engine, identify ambiguities or errors, and correct mis-transcriptions. The result can include a well-defined vocabulary of ASR errors that can provide insight into areas of difficulty for the ASR engine and allow for the evaluation of ASR system. The system 100 can be arranged to perform homophone resolution, as well as more general error resolutions based on, for example, word vector similarities, probability in context, and phonetic similarities. The LPP system 100 can be implemented such that error resolution might be performed automatically. In this way, it can be used in speech-to-text pipelines to yield more reliable transcripts without any human intervention.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" or "communication device," as used in this disclosure, means any computing device, hardware, or computing resource that can transmit or receive digital or analog signals or data packets, or instruction signals or data signals over a communication link. The device can be portable or stationary.

The term "communication link," as used in this disclosure, means a wired or wireless medium that conveys data or information between at least two points. A communication link can include a network. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, Bluetooth or another communication protocol or standard. A communication link can include a public switched telephone network (PSTN) line, a voice-over-Internet-Protocol (VoIP) line, a cellular network link, or an Internet protocol link. The Internet protocol may include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP), a transport layer (e.g., TCP, UDP, DCCP, SCTP, RSVP), an Internet layer (e.g., IPv4, IPv6, ICMP, ICMPv6, ECN, IGMP, IPsec), and a link layer (e.g., ARP, NDP, OSPF, Tunnels (L2TP), PPP, MAC (Ethernet, DSL, ISDN, FDDI).

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, TPU, ASICs, general purpose computers, super computers, personal computers, laptop computers, palmtop computers, notebook computers, desktop computers, workstation computers, or servers.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "computer resource" or "computing resource," as used in this disclosure, means software, a software application, a web application, a web page, a computer application, a computer program, computer code, machine executable instructions, firmware, or a process that can be arranged to execute on a computing device or a communicating device.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a satellite network, a cable network, a public switched telephone network (PSTN), a storage-area network (SAN), a system-area network, a passive optical local area network (POLAN), an enterprise private network (EPN), a virtual private network (VPN), the Internet, or any combination of the foregoing, any of which can be configured to communicate data via a wireless or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for detecting and resolving mis-transcriptions in a transcript generated by an automatic speech recognition (ASR) system when transcribing a plurality of spoken words, the method comprising:
   receiving the generated transcript of a speech signal by at least one of a first machine learning system or a second machine learning system;
   receiving, at a research on artificial intelligence in linguistics and systems (RAILS) model from the ASR system, a corpus comprising the generated transcript and one or more other transcripts, wherein at least one of the first machine learning system and the second machine learning system implements the RAILS model, the RAILS model comprising a building block comprising (1) a dataset containing all unigrams, bigrams, trigrams and quadgrams present in the corpus and their respective probabilities, and (2) a phonetic encoding component for determining phonetic similarity between lexical items;
   integrating a pre-trained language model, including a bidirectional encoder representation from transformers (BERT) model or a generative pre-trained transformer (GPT-3) model, to further analyze and process the transcript;
   analyzing, by the at least one of the first machine learning system and the second machine learning system, the generated transcript utilizing the RAILS model to find a region of low confidence indicative of a mis-transcription;
   analyzing, by the at least one of the first machine learning system and the second machine learning system, the region of low confidence utilizing the BERT model or the GPT-3 model subsequent to the analyzing utilizing the RAILS model to predict an improvement to the region of low confidence indicative of the mis-transcription, the predicted improvement comprising a homophone of the found region having substantially a same pronunciation and different meaning therefrom, wherein the same pronunciation indicates a higher level of phonetic similarity than one homophone having only a similar pronunciation;
   selecting, by a word selector, a replacement word for the mis-transcription based on the predicted improvement to the region of low confidence, wherein the improvement is predicted responsive to the region of low confidence being partially caused by a degraded signal of a channel used to perform at least one of the receptions or an obtainment of the spoken words; and
   replacing, by the word selector, the mis-transcription by the replacement word.

2. The computer-implemented method in claim 1, wherein the first machine learning system and the second machine learning system are connected in tandem.

3. The computer-implemented method in claim 1, wherein the first machine learning system and the second machine learning system are connected in parallel.

4. The computer-implemented method in claim 1, wherein the second machine learning system comprises a bidirectional encoder representation from transformers (BERT) model architecture.

5. The computer-implemented method in claim 1, wherein the second machine learning system comprises a generative pre-trained transformer 3 (GPT-3) model architecture.

6. The computer-implemented method in claim 1, wherein the word selector comprises a trained decision trees model.

7. The computer-implemented method in claim 1, wherein the word selector comprises a Random Forests model.

8. The computer-implemented method in claim 1, wherein the RAILS model is constructed from a building block, comprising a phonetic encoding component for determining the same pronunciation.

9. A system for detecting and resolving mis-transcriptions in a transcript generated by an automatic speech recognition (ASR) system when transcribing a plurality of spoken words, the system being configured to:
receive the generated transcript of a speech signal;
receive, at a research on artificial intelligence in linguistics and systems (RAILS) model from the ASR system, a corpus comprising the generated transcript and a plurality of other transcripts, the RAILS model comprising a building block comprising (1) a dataset containing all unigrams, bigrams, trigrams and quadgrams present in the corpus and their respective probabilities, and (2) a phonetic encoding component for determining phonetic similarity between lexical items;
integrate a pre-trained language model, including a bidirectional encoder representation from transformers (BERT) model or a generative pre-trained transformer (GPT-3) model, to further analyze and process the transcript;
implement at least one of a first machine learning system and a second machine learning system that
(i) analyzes the generated transcript in tandem or in parallel,
(ii) finds a region of low confidence indicative of a mis-transcription utilizing the RAILS model, and
(iii) analyzes the region of low confidence utilizing the BERT model or the GPT-3 model subsequent to the analyzing utilizing the RAILS model to predict an improvement to the region of low confidence, the predicted improvement comprising a homophone of the found region having substantially a same pronunciation and different meaning therefrom, wherein the same pronunciation indicates a higher level of phonetic similarity than one homophone having only a similar pronunciation;
receive the generated transcript and the predicted improvement to the region of low confidence, wherein the improvement is predicted responsive to the region of low confidence being partially caused by a degraded signal of a channel used to perform at least one of the receptions or an obtainment of the spoken words;
based on the predicted improvement to the region of low confidence, select a replacement word for the mis-transcription; and
replace the mis-transcription by the replacement word.

10. The system in claim 9, wherein the second machine learning system comprises a BERT model architecture.

11. The system in claim 9, wherein the second machine learning system comprises a GPT-3 model architecture.

12. The system in claim 9, wherein the second filter comprises a trained decision trees model or a Random Forests model.

13. A non-transitory computer readable storage medium comprising instructions for detecting and resolving mis-transcriptions in a transcript generated by an automatic speech recognition system (ASR) when transcribing a plurality of spoken words, the instructions, when executed by a processor, cause the processor to:
receive the generated transcript of a speech signal;
receive, at a research on artificial intelligence in linguistics and systems (RAILS) model from the ASR system, a corpus comprising the generated transcript and a plurality of other transcripts, the RAILS model comprising a building block comprising (1) a dataset containing all unigrams, bigrams, trigrams and quadgrams present in the corpus and their respective probabilities, and (2) a phonetic encoding component for determining phonetic similarity between lexical items;
integrate a pre-trained language model, including a bidirectional encoder representation from transformers (BERT) model or a generative pre-trained transformer (GPT-3) model, to further analyze and process the transcript;
implement at least one of a first machine learning system and a second machine learning system that analyzes the generated transcript to find a region of low confidence indicative of a mis-transcription utilizing the RAILS model, the at least one of the first machine learning system and the second machine learning system comprising the RAILS model, wherein the first machine learning system is configured to analyze the region of low confidence utilizing the BERT model or the GPT-3 model subsequent to the analyzing utilizing the RAILS model to predict an improvement to the region of low confidence, the predicted improvement comprising a homophone of the found region having substantially a same pronunciation and different meaning therefrom, wherein the same pronunciation indicates a higher level of phonetic similarity than one homophone having only a similar pronunciation;
select, by a word selector, a replacement word for the mis-transcription based on the predicted improvement to the region of low confidence, wherein the improvement is predicted responsive to the region of low confidence being partially caused by a degraded signal of a channel used to perform at least one of the receptions or an obtainment of the spoken words; and
replace, by the word selector, the mis-transcription by the replacement word.

14. The non-transitory computer readable storage medium in claim 13, wherein the first machine learning system and the second machine learning system are connected in tandem.

15. The non-transitory computer readable storage medium in claim 13, wherein the first machine learning system and the second machine learning system are connected in parallel.

16. The non-transitory computer readable storage medium in claim 13, wherein the second machine learning system comprises a BERT model architecture, and wherein the word selector comprises a trained decision trees model.

* * * * *